(12) United States Patent
Baek et al.

(10) Patent No.: US 9,167,164 B2
(45) Date of Patent: Oct. 20, 2015

(54) METADATA ASSOCIATED WITH FRAMES IN A MOVING IMAGE

(71) Applicant: Samsung Electronics Co., Ltd., Gyeonggi-do (KR)

(72) Inventors: Woohyun Baek, Gyeonggi-do (KR); Kwangju Lee, Gyeonggi-do (KR); Seungjoo Choe, Seoul (KR); Hyunho Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/775,459

(22) Filed: Feb. 25, 2013

(65) Prior Publication Data

US 2013/0222640 A1    Aug. 29, 2013

(30) Foreign Application Priority Data

Feb. 27, 2012    (KR) .......... 10-2012-0019895

(51) Int. Cl.
| | | |
|---|---|---|
| *H04N 5/76* | (2006.01) | |
| *H04N 5/232* | (2006.01) | |
| *G11B 27/30* | (2006.01) | |
| *H04N 5/92* | (2006.01) | |
| *H04N 9/804* | (2006.01) | |
| *G11B 27/034* | (2006.01) | |
| *G11B 27/10* | (2006.01) | |
| *G11B 27/28* | (2006.01) | |
| *G11B 27/34* | (2006.01) | |
| *H04N 5/222* | (2006.01) | |

(52) U.S. Cl.
CPC .......... *H04N 5/23293* (2013.01); *G11B 27/034* (2013.01); *G11B 27/105* (2013.01); *G11B 27/28* (2013.01); *G11B 27/3027* (2013.01); *G11B 27/34* (2013.01); *H04N 5/9201* (2013.01); *H04N 9/8042* (2013.01)

(58) Field of Classification Search
USPC ................................ 348/231.2–231.3, 333.05
See application file for complete search history.

(56) References Cited

U.S. PATENT DOCUMENTS

| | | | | |
|---|---|---|---|---|
| 8,064,633 | B2 * | 11/2011 | Noda et al. .................... | 382/100 |
| 8,116,526 | B2 * | 2/2012 | Sroka et al. .................... | 382/103 |
| 8,169,492 | B2 * | 5/2012 | Blumenfeld ............. | 348/211.11 |
| 8,422,857 | B2 * | 4/2013 | Kashima ........................ | 386/241 |
| 2002/0021281 | A1 * | 2/2002 | Asami ........................... | 345/156 |
| 2008/0062322 | A1 * | 3/2008 | Dey et al. ...................... | 348/589 |
| 2009/0228508 | A1 * | 9/2009 | Date et al. ..................... | 707/102 |
| 2010/0111501 | A1 | 5/2010 | Kashima | |
| 2010/0265177 | A1 * | 10/2010 | Fujimoto et al. .............. | 345/162 |
| 2010/0309975 | A1 | 12/2010 | Zhou et al. | |
| 2012/0051713 | A1 * | 3/2012 | Myung ......................... | 386/225 |
| 2012/0203506 | A1 * | 8/2012 | Hatanaka et al. ............. | 702/176 |

FOREIGN PATENT DOCUMENTS

| | | |
|---|---|---|
| EP | 2 048 665 A1 | 4/2009 |
| JP | 2012-034397 A | 2/2012 |

* cited by examiner

*Primary Examiner* — Ngoc-yen Vu
(74) *Attorney, Agent, or Firm* — Cha & Reiter, LLC.

(57) ABSTRACT

An apparatus and method generate and store metadata in a moving image shooting mode for use in playing and editing the moving image. The moving image processing method of the apparatus equipped with a camera includes acquiring images at every frame period in a moving image shooting mode; generating metadata of the images; encoding the images into the moving image; storing the moving image with the metadata; and displaying a specific metadata selected among the metadata as supplementary functions of the moving image in a moving image playback mode.

23 Claims, 32 Drawing Sheets

BACKUP OF HIGH QUALITY PICTURE INCLUDING METADATA ACQUIRED AT DETECTION TIMING

RECODED MOVING IMAGE

METADATA ASSOCIATED WITH FRAMES IN A MOVING IMAGE

CLAIM OF PRIORITY

This application claims, pursuant to 35 U.S.C. §119(a), priority to and the benefit of the earlier filing date of a Korean patent application filed on Feb. 27, 2012 in the Korean Intellectual Property Office and assigned Serial No. 10-2012-0019895, the entire disclosure of which is hereby incorporated by reference.

BACKGROUND OF THE INVENTION

1. Field of the Invention

The present invention relates to a moving image shooting apparatus and method of a camera device, and in particular, to an apparatus and method for generating and storing metadata when shooting a moving image for use in playing and editing the moving image.

2. Description of the Related Art

A camera device and mobile terminal equipped with a camera are capable of processing high quality images and providing various user convenience functions. A camera device in the prior art is equipped with an image sensor (or camera sensor) capable of processing full High Definition (HD) or higher resolution images.

Such a camera device in the prior art displays the image sensed by the camera sensor in a preview mode and saves the image acquired by the camera sensor in response to a push on a shutter button. In the prior art, the images acquired by the camera sensor can be coded and stored in the form of a moving image so as to be replayed afterward. However, the camera device of the prior art is limited in processing the stored moving image for use in a function other than playback.

SUMMARY OF THE INVENTION

The present invention is an apparatus and method for logging metadata when shooting a moving image and utilizing the metadata in processing, e.g. playing and editing, the moving image for various supplementary functions.

Also, the present invention is an apparatus and method for storing the information generated by a camera and sensors of the camera when shooting a moving image as metadata along with the moving image. The metadata may include a shooting time and a thumbnail image. The apparatus and method of the present invention are capable of editing the moving image using the metadata stored when shooting the moving image and generating and displaying an image with a supplementary function using the moving image.

In accordance with an aspect of the present invention, a moving image processing method of an apparatus equipped with a camera includes acquiring images at every frame period in a moving image shooting mode; generating metadata of the images; encoding the images into a moving image; storing the moving image with the metadata; and displaying a specific metadata selected among the metadata as supplementary functions of the moving image in a moving image playback mode.

In accordance with another aspect of the present invention, a moving image shooting and playback apparatus includes a camera which acquires a moving image; an image signal processor which processes frame images acquired by the camera and generates camera shooting information of the frame images; a sensor unit which comprises at least one sensor; a storage unit which stores the moving image; an application processor (AP) which encodes the consecutive frame images into a moving image and stores the moving image with the metadata output by the camera and sensor unit in a moving image shooting mode and displays the moving image along with a specific metadata selected among the metadata as supplementary function in a moving image playback mode; and a display unit which displays the moving image under the control of the application processor.

In accordance with still another aspect of the present invention, a terminal apparatus includes a communication unit which is responsible for radio communication with an external device; a terminal controller which controls voice call and communication services of the terminal through communication unit; a camera which acquires images in a moving image shooting mode; an image signal processor which converts images acquired at every frame to viewing images and generates metadata of the viewing images; an application processor which encodes the viewing images into the moving image, regenerates the metadata, and stores the metadata in a storage unit along with the moving image; and a display unit which displays the moving image.

BRIEF DESCRIPTION OF THE DRAWINGS

FIG. 16 is a diagram illustrating the mechanism of processing a thumbnail image under the condition for the case when the thumbnail function is turned on;

DETAILED DESCRIPTION OF THE INVENTION

Figure 1:
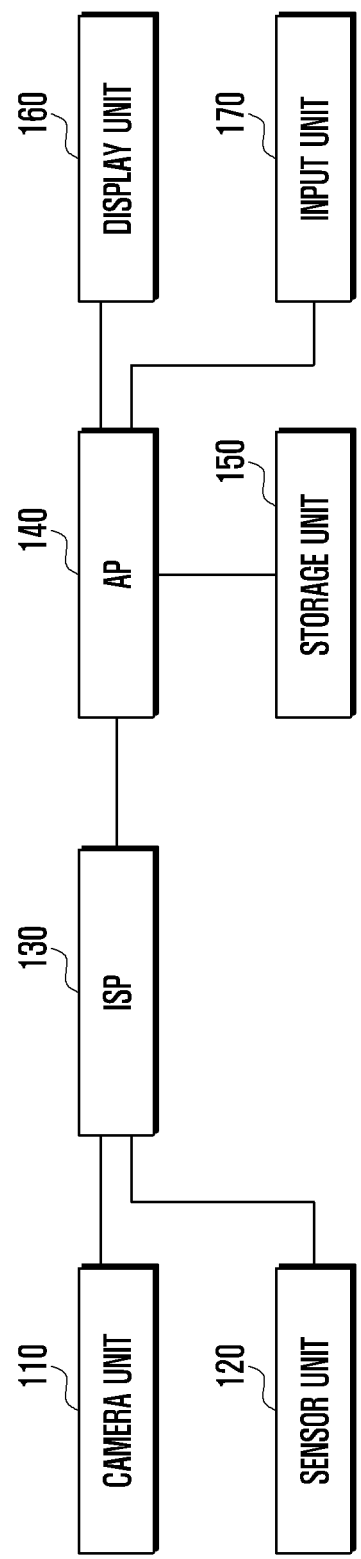
FIG. 1 is a block diagram illustrating the configuration of the camera device according to an exemplary embodiment of the present invention.

Exemplary embodiments of the present invention are described with reference to the accompanying drawings in detail. The same reference numbers are used throughout the drawings to refer to the same or like parts.

Although detailed features such as number of pixels of image, a meta data item, and data size are presented in the following description, it is obvious to those skilled in the art that these features are given as examples only to help understand the invention but not restrict the present invention. In the following description, a detailed description of well-known functions and structures incorporated herein may be omitted to avoid obscuring the subject matter of the present invention.

The present invention may, however, be embodied in many different forms and should not be construed as limited to the exemplary embodiments set forth herein. In addition, terms described herein, which are defined with reference to the functions of the present invention, may be implemented differently depending on a user or operator's intention and practice. Therefore, the terms should be understood on the basis of the disclosure throughout the specification. The principles and features of this invention may be employed in varied and numerous embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among the terms set forth herein, data refers to any kind of information processed by the device, including text and/or images received from any external entities, messages transmitted or received, and information created when a specific function is executed by the device.

The present invention relates to a camera device or a terminal apparatus equipped with a camera for acquiring a moving image using the camera and storing the moving image along with the shooting information acquired from the camera and/or the sensors of the camera device. Here, it is possible to acquire a plurality of images when shooting a moving image, and the images can be the images for use as preview images or a moving image, and images for capturing still images. The shooting information can be the information generated by the camera and/or sensors of the apparatus in taking the images of the corresponding frame when the camera takes the images (hereinafter, the term "shooting information" is used interchangeably with the terms "metadata" and 'embedded data").

Here, the viewing image can be a YUV image adjusted (cropped and/or scaled) to fit the size of the display unit. The captured image is the image acquired using the camera sensor and can be a compressed image which is represented by a JPEG image in an exemplary embodiment of the present invention. In the exemplary embodiment of the present invention, an apparatus and method generate and buffer the viewing images and compressed images at every frame while the camera is operating and store the metadata along with the coded viewing images while shooting a moving image is performed.

The JPEG images may be formatted to comply with any known JPEG standard, for example, the JPEG Part 4 standard specified by ISO/IED 10918-4:1999.

The metadata is the camera sensor information and the information generated by camera sensors or apparatus while the camera is operating. Typically, the camera device has only the information for use in setting the camera sensor such as Exchangeable Image File Format (exif) data. The exif data may include information on a camera maker, a camera model, an image editor such as software, a picture modification date such as a date and/or time parameter, an ExifVersion, a shoot date such as a shooting date and/or time, an image size, an exposure time representing a shutter speed, an exposure program, a focal length, a diaphragm aperture (F-number), and whether a flash has been used or not. However, the memory space for storing the information is limited and referenced only with the captured image. The present invention provides an apparatus and method for acquiring the metadata from the sensors of the camera and/or an apparatus and playing and processing the images using the metadata efficiently.

The camera device or the terminal apparatus equipped with a camera according to the exemplary embodiment of the present invention acquires images from the camera sensor at every frame period and converts the acquired images to viewing images and compressed images while acquiring the metadata from the camera sensor and/or the sensors of the apparatus simultaneously at the image acquisition time, displaying the viewing images on the display unit, and buffering the viewing images and compressed images and the metadata, while the camera is operating.

If a capture request is generated, the camera device selects and stores a JPEG image, at the time when the capture request is detected, among the buffered compressed images, with the JPEG image corresponding to the thumbnail image selected among the presented thumbnail images, or the JPEG data selected by the user with reference to the presented metadata.

If a moving image shooting request is input, the camera device performs compression coding on the buffered viewing images to generate the moving image and stores the moving image along with the buffered metadata. At this time, the metadata may include the thumbnail images and may be stored at every frame or at a predetermined number of frames. It is possible to store the entire metadata or different parts of the metadata which are not identical to previously stored metadata. That is, when the metadata changes, the present invention may store the previously stored metadata, and only additionally store any changes in the metadata relative to the previously stored metadata.

In the following description, exemplary embodiment of the present invention is directed to the case where the camera device generates the viewing images and compressed images and metadata at every frame. However, it is also possible for the apparatus and method according to the exemplary embodiment of the present invention to generate only the viewing image and metadata at every frame.

The term "viewing image" can be used to express that the image has not been finalized but is only stored as a preview image, and the description is made using an example, in the exemplary embodiment of the present invention, such that the viewing image is a YUV image. Although the description is directed to the case that the viewing image is resized and/or scaled, the viewing images acquired by the camera can be used without being resized and/or scaled. According to the exemplary embodiment of the present invention, the viewing image can be the image to be compression-coded for generating a moving image in an MPEG format. The compressed image is defined herein as the image compressed in a still image format through a compression-coding method, and the description is made using an example such that the compressed image is a JPEG image in the exemplary embodiment of the present invention.

A description is made of the present invention with reference to drawings hereinafter. The description is made with reference to an exemplary camera device hereinafter.

FIG. 1 is a block diagram illustrating the configuration of the camera device according to the exemplary embodiment of the present invention. In FIG. 1, the sensor unit 120 is connected to an Image Signal Processor (ISP) 130 which generates metadata. The sensor unit 120 may include at least one of a Global Positioning System (GPS) receiver, a gyro sensor, an acceleration sensor, an altitude sensor, an illuminance sensor, and a direction sensor mounted on or within the camera device. The ISP 130 processes the image acquired by the camera unit 110 to generate the viewing and compressed images. Here, the viewing image is the image displayed on the display unit 160 and compression-coded into the moving image. Here, the viewing image can be a YUV image. The YUV is a color emission format (color space) in which Y denotes brightness (luminance), and U and V denote chrominance, i.e. U for a difference between luminance and a blue component (Y-B) and V for a difference between luminance and a red component (Y-R). The ISP 130 performs color conversion on the image acquired from the camera unit 110 to generate the YUV image and adjusts the image in size (scaling and/or cropping) to fit the display unit 160. That is, the ISP 130 generates the YUV image and scales the YUV image to a size fitting the display capability of the display unit 160. The ISP 130 also performs coding on the image output by the camera unit 110 to generate the compressed image. Here, the compressed image is the image to be stored in response to the capture request of the user and may be the image acquired by compression-encoding the image obtained by the camera unit 110.

The ISP 130 also acquires the metadata of the image from the camera unit 110 and the sensor unit 120. At this time, the metadata may include supplementary information in addition to the exif information acquired when the camera unit 110 takes or captures the image.

The ISP 130 is capable of generating the viewing image and the compressed image at every frame period or the viewing image, the compressed image, and the shooting information at every frame period. The ISP 130 is also capable of generating the viewing images and compressed images (or viewing and compressed images and metadata) at the frame rate of 30 frames per second (30 fps) or higher (e.g. 60 fps).

The Application Processor (AP) 140 controls buffering of the viewing and compressed images (or viewing and compressed images and shooting information) generated by the ISP 130 and controls displaying of the viewing images on the display unit 160 while the camera is operating. If the user's capture request command is detected, the AP 140 stores the compressed image corresponding to the frame at the time when the capture request command is detected so as to select the compressed image having zero shutter lag. If a moving image shooting request is input, the AP 140 performs compression-coding on the viewing image to store the compressed image in the storage unit 150 and processes the metadata in a predetermined way to store the metadata in synchronization with the frame rate of the moving image. At this time, the metadata can be stored or not stored according to a user setting at the moving image shooting time. In the case of storing the metadata, the metadata can be stored as the information indicating differences between the current and previous frames (hereinafter, referred to interchangeably as "delta information") or as information generated by the ISP 130. The metadata can be stored at every frame or at predetermined frame number interval. The metadata also may include the thumbnail image of the corresponding frame.

The input unit 170 is capable of generating a camera driving command, a still image capture command, and a moving image shooting command which are output to the AP 140. The input unit 170 is also capable of generating a command requesting metadata and/or thumbnail images in response to the user command. The display unit 160 displays the viewing image output by the AP 140 in the preview mode and moving image shooting mode and the stored moving image in moving image playback mode. Here, the input unit 170 can be a touch panel capable of detecting a user's touch input, and the display unit 160 can be implemented with an LCD panel or an OLED panel for displaying the data and an image generated by execution of a program. The input unit 170 and the display unit 160 can be integrated into a touchscreen. The input unit 170 may also include buttons arranged on or extending from an exterior of the camera device.

The storage unit 150 stores the compressed images being buffered in the AP 140.

Figure 2:
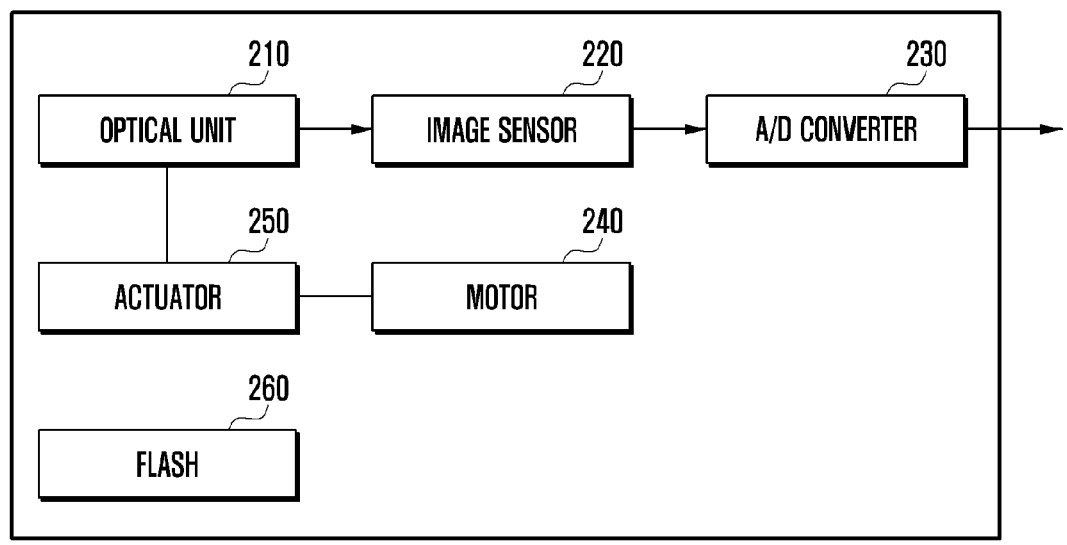
FIG. 2 is a block diagram illustrating the configuration of the camera unit according to the exemplary embodiment of the present invention.

FIG. 2 is a block diagram illustrating the configuration of the camera unit 110 according to the exemplary embodiment of the present invention.

Referring to FIG. 2, if the camera driving command is generated, the camera unit 110 powers on. The ISP 130 drives the motor 240, and the actuator 250 controls the operation of the optical unit 210. Here, the operation of the optical unit 210 may include zoom-in and focusing operations. The optical unit 210 takes or captures an image around a shooting time, and generates an optical signal corresponding to or encoding the image, and the image sensor 220 senses the image taken by the optical unit 210 and converts the optical signal of the image to an electric signal. Alternatively or in addition, the optical unit 210 outputs light, for example, for focusing operations, and the image sensor 220 converts the light emitted by the optical unit 210 to an electric signal and generates a corresponding image signal. Here, the image sensor 220 can be any known image sensor supporting full HD or higher resolution. The image sensed by the image sensor 220 is converted to a digital image by the A/D converter 230 and then transferred to the ISP 130. The flash 260 can be driven by the ISP 130 to generate a flash of light for imaging and optical operations.

Figure 3:
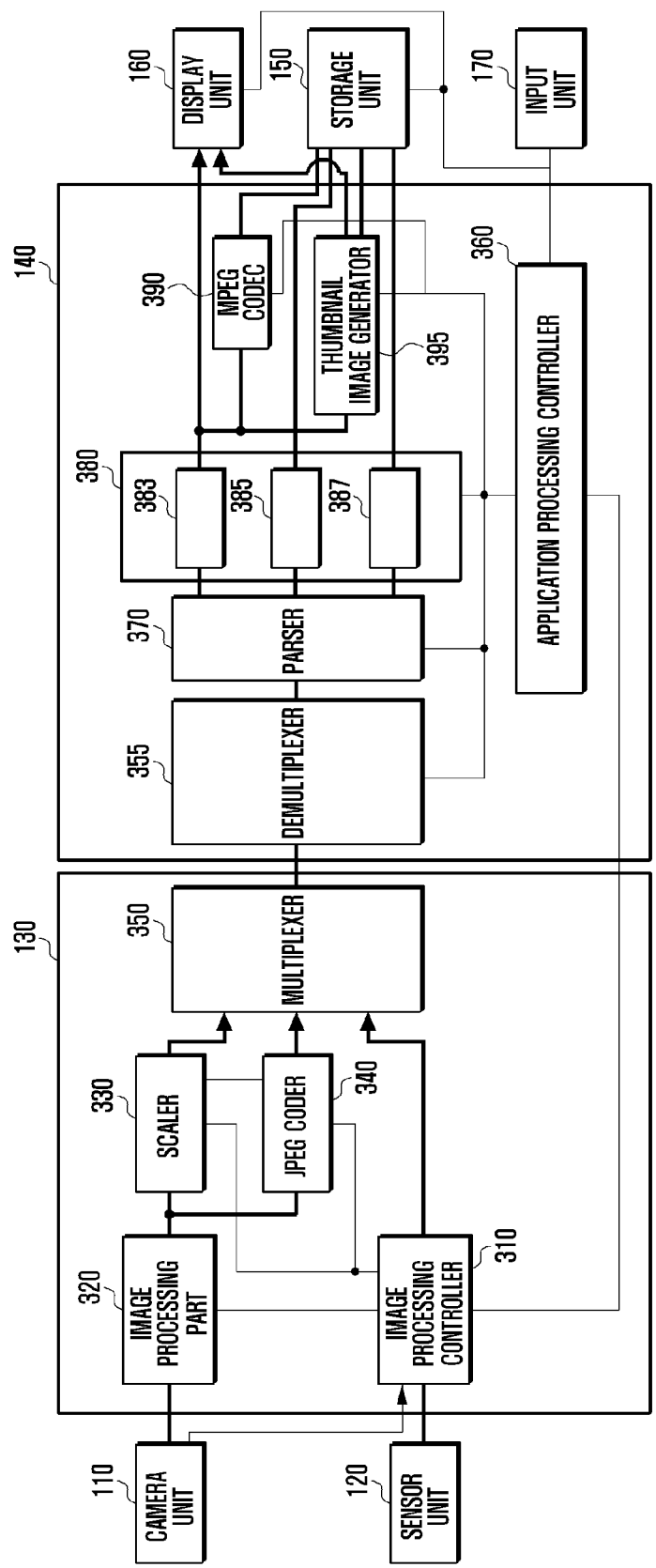
FIG. 3 is a block diagram illustrating the configuration of the image signal processor (ISP) and the application processor (AP) according to the exemplary embodiment of the present invention.

FIG. 3 is a block diagram illustrating the configuration of the ISP 130 and AP 140 according to the exemplary embodiment of the present invention.

Referring to FIG. 3, the image processing part 320 of the ISP 130 converts the image output by the camera unit 110 to a YUV image. Here, the image processing part 320 may include a pre-processing part and a post-processing part. In this case, the pre-processing part performs pre-processing on the image acquired from the camera unit 110, and the pre-processing may include 3A (Auto White Balance (AWB), Auto Exposure (AE), and Auto Focusing (AF)) extraction and processing, lens shading correction, dead pixel correction, bad pixel compensation, etc. The post-processing performs pre-processed color interpolation, noise removal, color compensation, and image conversion to generate YUV data. The ISP 130 includes a still image compressor (still image encoder) 340 for storing the still image, and the still image compressor 340 may support a still image coding method such as JPEG and TIFF. In the exemplary embodiment of the present invention, for example, the still image compressor 340 is a JPEG coder.

The JPEG coder 340 compresses the image output by the image processing part 320 into a JPEG image. The scaler 330 scales the image output by the image processing part 320 to a size fitting the display unit 160. The scaler 330 is capable of at least one of scaling, cropping, and resizing image components. In the case that the image processing part 320 does not perform the color conversion function, the scaler 330 can be implemented as a viewing image generator, and in this case, the viewing image generator may include a color converter for converting the raw image to a YUV image and a for performing scaling functions. The scaler 330 is also capable of generating the viewing images with different sizes (numbers of pixels) in the preview mode and moving image shooting mode. For example, the scaler 330 is capable of generating a viewing image to be displayed on the display unit 160 in the preview mode and another viewing image to be compression-coded into a moving image in the moving image shooting mode. In this case, the scaler 330 is capable of processing the viewing image to generate a moving-image-mode image with a number of pixels which is greater than that of the viewing image of the preview mode. At this time, the number of the pixels of the viewing image may be equal to or less than the image acquired by the camera unit 110 and equal to or greater than that of the preview image.

The image processing controller 310 controls the operation of the camera unit 110 and general operation of the ISP 130 in the camera operation mode under the control of the application processing controller 360. The image processing controller 310 is also capable of generating metadata with the input of the information or data associated with the image taken by the camera unit 110 and generated by the sensor unit 120 while camera unit 110 is operating. The compressed and viewing image and/or metadata is regenerated at every frame, and each frame can be generated at the frame rate of 30 or 60 frames per second. If a moving image shooting mode control signal is received from the AP 140, the image processing controller 310 controls the scaler 330 to scale the viewing image to the size to be stored in the form of a moving image. The size of the moving image can be determined between the size of the image taken by the camera unit 110 and the size of the viewing image in the preview mode as described above. In the moving image shooting mode, the image processing controller is capable of controlling the operation of the JPEG coder 340. That is, the JPEG image is used for capturing a still image. The image processing controller 310 is capable of stopping operation of the JPEG coder 340 in the moving image shooting mode and scaling the image output by the camera unit 110 and compressing the scaled image. That is, the image processing controller 310 is capable of stopping the operation of the JPEG coder 340 in the moving image shooting mode and compressing the image output by the camera unit 110 or reducing the number of pixels of the image output by the camera unit 110, i.e. scaling to compress the image, while the JPEG coder 340 is operating. In the case of compressing the scaled image, the YUV image output by the scaler 330 can be compressed. In the exemplary embodiment of the present invention, it is also possible to operate the JPEG coder 340 to capture a still image while shooting a moving image, and at this time, for example, the image input to the JPEG coder 340 is one of the image output by the camera unit 110 or the scaled image.

The multiplexer 350 multiplexes the compressed and viewing images and/or metadata and transfers the multiplexing result to the AP 140 under the control of the image processing controller 310.

In addition, the ISP 130 may include a thumbnail image generator for converting the viewing images to thumbnail images. In this case, the ISP 130 generates the thumbnail images from the viewing images, and the JPEG coder 340 compresses the output of the image processing part 320 and may generate a compressed image including a header of the compressed image, the thumbnail image, and the compressed JPEG image.

In the configuration of the AP 140, the application processing controller 360 controls the operation of the ISP 130 according to the command of the input unit 170, buffers and displays the images output by the ISP 130 on the display unit 160, and stores the buffered compressed image in the storage unit 150 when the capture command is detected. The application processing controller 360 controls such that the metadata is stored in the storage unit 150 along with the moving image according to the configured condition in the moving image shooting mode. At this time, the metadata may include the thumbnail image. In the moving image playback mode, the application processing controller 360 controls the display unit 160 to display the moving image, and at this time, controls updating or adding the information configured through moving image editing with the stored metadata in response to a request input through the input unit 170.

The demultiplexer 355 demultiplexes and outputs the viewing and compressed images and metadata from the ISP 130 under the control of the application processing controller 360. The parser 370 parses the images and information demultiplexed by the demultiplexer 355 into the viewing and compressed images and metadata. In an alternative exemplary embodiment, in the case that the application processing controller 360 controls the demultiplexer 355 to perform software parsing on the output of the ISP 130 to acquire the viewing and compressed images (or viewing and compressed images and shooting information), the parser 370 can be omitted. The buffer 380 may include a viewing image buffer 383 and a compressed image buffer 385 and/or a metadata buffer 387. The buffer 380 buffers the parsed viewing and compressed images and metadata under the control of the application processing controller 360. Here, the buffer 380 has a size capable of buffering the viewing and compressed images and/or metadata of N frames and can be configured, for example, in a ring buffer structure. The reason for configuring buffer 380 in the ring buffer structure is to restrict the images and information of the received frames to a predetermined number.

The AP 140 may include a video or moving image codec (moving image coder/decoder) 390 for compressing moving image data in response to a moving image save request, and the moving image codec 390 may include various moving image codecs such as H.264 and MPEG codecs. In the exemplary embodiment of the present invention, the moving image codec 390 is an MPEG codec. If a moving image save request is input by the user, the application processing controller 360 drives the MPEG codec 390 to compress the viewing images buffered in the viewing image buffer 383 of the buffer 380 and to store the compression result in the storage unit 150. The AP 140 may also include a thumbnail image generator 395 for generating thumbnail images by resizing the viewing images. The thumbnail image generator 395 resizes the viewing image output from the viewing image buffer 383 to generate the thumbnail image which may include a JPEG image and which may be displayed on the display unit 160 under the control of the application processing controller 360. The AP 140 may also include a JPEG codec. In the case that the metadata includes the thumbnail image stored in compressed format, the JPEG codec is capable of encoding the thumbnail image to reduce its size and decoding the compressed thumbnail image to play or display the thumbnail image. The JPEG codec is capable of decoding the compressed image stored in the storage unit 150 to play or display the decoded image.

While the AP 140 is capturing a still image or shooting a moving image, the ISP 130 is capable of generating the viewing image, the captured image, and metadata continuously, and the AP 140 controls the display unit 160 to display the viewing image.

In the above-structured camera device, if a camera drive command is generated through the input unit 170 (i.e. if the preview mode execution is requested, the application processing controller 360 notifies the ISP 130 of the input command, and the image processing control unit 310 drives the camera unit 110. The image output by the camera unit 110 is transferred to the ISP 130.

The ISP 130 generates the viewing and compressed images and metadata at every frame period. Here, the ISP is capable of generating the frame images at the frame rate of 30 fps or higher (e.g. 60 fps). At this time, the image processing part 320 performs 3A processing, color interpolation and/or YUV converting on the raw image input from the camera unit 110, and in this case, the image can be a full-resolution image of the camera unit 110.

The JPEG coder 340 processes the image output by the image processing part 320 to generate a compressed image. At this time, the compressed data can be a JPEG image or an image coded in a size reduction coding format known in the art and different from the JPEG. In the exemplary embodiment of the present invention, for example, the compressed data is the image coded in the JPEG format. The scaler 330 generates a viewing image by scaling the image output from the image processing part 320 to fit a predetermined size for display on the display unit 160. At this time, the image scaling can be done with at least one of cropping, resizing, and the like to generate the viewing image. Here, the viewing image can be the image to be displayed on the display unit 160 and/or the image to be stored when capturing a moving image. At this time, the scaler 330 of the ISP 130 may change the data size of the viewing image for use in the preview mode or in storing the moving image. As described above, in the case that the image processing part 320 is not performing the color conversion function, the scaler 330 can be configured as a viewing image generator. In this case, the viewing image generator can be configured to have the scaling function and the color conversion function for converting a raw image to a YUV image.

When generating the viewing and compressed images at every frame period, the ISP 130 also generates the metadata with various sensor information acquired while the camera device takes the images. Typically, the camera device has the information for setting the camera unit 110 but not the information provided by the camera unit 110. When storing the output image of the camera unit 110, exif data is generated; however, the exif data is limited in amount for storing the shooting information and can be referenced only from the captured image. In the exemplary embodiment of the present invention, if the camera unit 110 is driven or if the moving image shooting mode is executed, the image processing controller 310 acquires the metadata of every frame from the camera unit 110 and the sensor unit 120 positioned on or extending from an exterior of the camera device and buffers the metadata along with the corresponding frame image as embedded data for use in executing the various functions of the camera device efficiently.

In the exemplary embodiment of the present invention, the ISP 130 receives every frame image from the camera unit 110 to generate the viewing and compressed images and generates the metadata of the corresponding frame images (image data plus embedded data). Examples of the metadata (embedded data) can include the data shown in Table 1.

TABLE 1

| Meta Data | Size | Remark |
| --- | --- | --- |
| TimeStamp YYYY/MM/DD, HH/MM/SS | 8 byte | Year, month, date, time information of image shooting |
| Frame count | 4 byte | Store frame count value |
| Flash | 4 byte | Use when flagged, flash capable of checking full flashlight amount to operate. |
| ISO | 4 byte | Store ISO information |
| EV | 4 byte | Store Exposure Value |
| Data type | 4 byte | Store data type of JPEG, YUV, and meta data |
| Data size | 4 byte | Use for storing size of variable JPEG and buffering JPEG image |
| Face detection | 4 byte | Store face detection function on/off |
| Face num | 4 byte | Store number of recognized faces |
| FD start x | 4 byte | Store start x value of face-recognized rectangular coordinates. Store as many as number of recognized faces like FD[0].sx, FD[1].sx |
| FD start y | 4 byte | Store start y value of face-recognized rectangular coordinates. Store as many as number of recognized faces like FD[0].sy, FD[1].sy |
| FD end x | 4 byte | Store right bottom x value of face-recognized rectangular coordinates. Store as many as number of recognized faces like FD[0].ex, FD[1].ex |
| FD end y | 4 byte | Store start x value of face-recognized rectangular coordinates. Store as many as number of recognized faces like FD[0].ey, FD[1].ey |
| Effect | 4 byte | Store configured effect value |
| White balance | 4 byte | Store configured white balance value |
| Scene mode | 4 byte | Store configured Scene mode value |
| Metering | 4 byte | Store configured sidelight mode value |
| I-frame | 4 byte | Store iframe information value in use of MPEG |
| P-frame | 4 byte | Store pframe information value in use of MPEG |
| Sharpness | 4 byte | Store configured sharpness value |
| Saturation | 4 byte | Store configured saturation value |
| Contrast | 4 byte | Store configured contrast value |
| HDR | 4 byte | Store HDR operation state |
| Zoom | 4 byte | Store configured zoom magnification |
| AF | 4 byte | Store auto-focus (AF) status |
| CAF x | 4 byte | Store x coordinate value in CAF operation |
| CAF y | 4 byte | Store x coordinate value in CAF operation |
| Gyro data | 4 byte | Store Gyro data value, use in shaking detection |
| Anti-shake | 4 byte | Store anti-shake function presence/absence |
| Quality | 4 byte | Store configured JPEG quality value |
| Storage | 4 byte | Store media data storage location |
| Shoot date | 4 byte | Store current time information |
| GPS Info. | 4 byte | Store GPS status |
| Location Info. | 4 byte | Store current location data value |

TABLE 1-continued

| Meta Data | Size | Remark |
| --- | --- | --- |
| Altitude Info. | 4 byte | Store current altitude information |
| Camera angle info. | 4 byte | Store current camera angle information |
| Acceleration sensor | 4 byte | Store acceleration sensor data value, use in shake detection |
| Thumbnail on/off | | Indicate whether metadata include thumbnail image |
| Thumbnail format | | Thumbnail image format (YUV or JPEG) |
| Thumbnail image | | Actual thumbnail image |

Using the above described shooting information (metadata), the user is capable of configuring various functions for taking pictures. That is, the user is capable of finding the setting value appropriate for the situation using the frequently pictured object information and camera menu information. For example, when a human face is detected in the preview mode, the camera device is capable of configuring the menu frequently used in taking a picture of the corresponding person and promising satisfactory output by referencing automatically a portrait database (DB) based on the shooting information. The user of the camera device who frequently takes portraits of family, friends, and lovers, and who entertains is capable of searching the portrait DB for information useful to take a picture of their portrait or, if no useful information, setting the menus helping to take their portrait (e.g. a smile shot, a beauty shot, a portrait scene mode, an AF mode, object tracking, ISO, an effect, white balance, exposure, metering, zooming, flash, etc.). Also, if no information on the person is provided in preview mode, the camera device is capable of setting the configuration appropriate for a landscape picture by checking the part related to the landscape picture (e.g. outdoor visible, flash, ISO, effect, white balance, exposure, metering, landscape scene mode, Fan focus mode, etc.). The images taken as described above can be stored on the basis of the user's camera utilization pattern (e.g. taking and storing a lover's photo in a lover album or posted to a designated SNS or uploaded to an electronic cloud storage system). The camera device is also capable of displaying the images taken continuously along with similarity information such that the user can check the similarity with albums or post-view images. If a specific metadata is set for use in the moving image shooting mode, it is possible to configure a moving image shooting function in accordance with the corresponding metadata (e.g. if the face recognition function is selected, it is possible to take a picture with the focus on the face in the scene).

The multiplexer 350 multiplexes the viewing image, the compressed image, and the metadata and outputs the multiplexing result to the AP 140 under the control of the image processing controller 310.

Figure 4A:
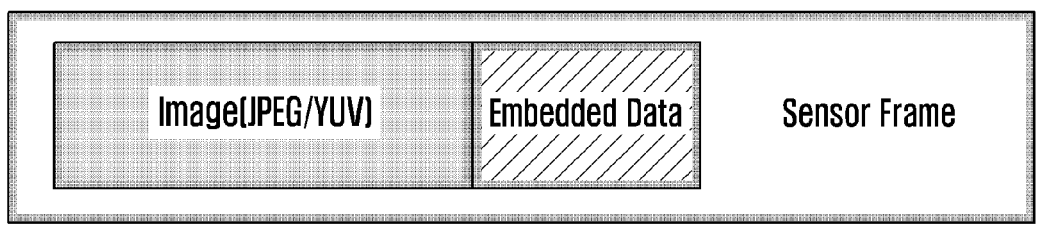
FIG. 4A is a diagram illustrating the structure of the image frame generated by the ISP according to the exemplary embodiment of the present invention.
Figure 4B:
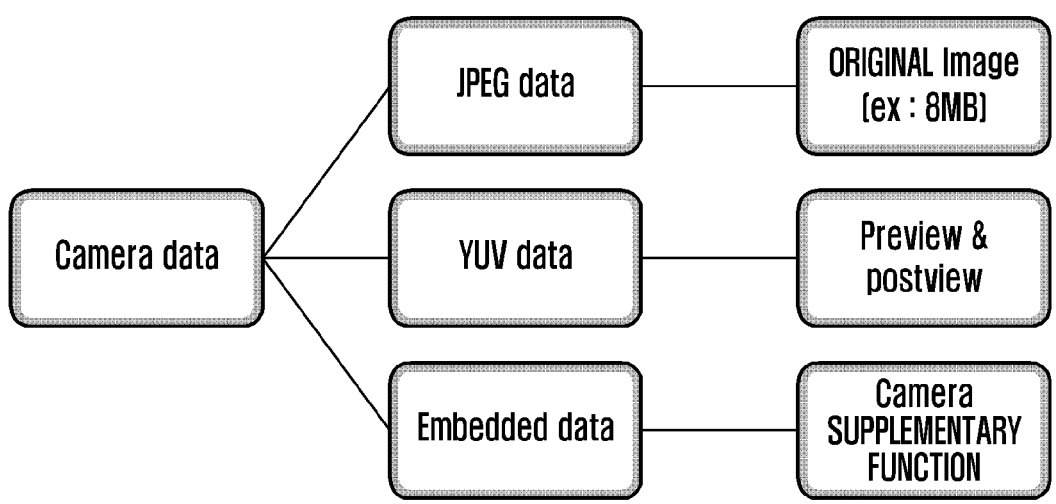
FIG. 4B is a diagram illustrating the format of the frame consisting of a YUV image, a JPEG image, and shooting information according to the exemplary embodiment of the present invention.
Figure 4C:
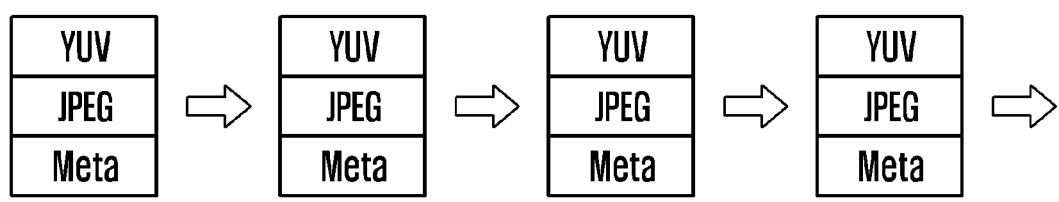
FIG. 4C is a diagram illustrating the data transfer format of every frame according to the exemplary embodiment of the present invention.

FIG. 4A is a diagram illustrating the structure of the image frame generated by the ISP 130 according to the exemplary embodiment of the present invention, FIG. 4B is a diagram illustrating the format of the frame consisting of a YUV image, a JPEG image, and shooting information according to the exemplary embodiment of the present invention, and FIG. 4C is a diagram illustrating the data transfer format of every frame according to the exemplary embodiment of the present invention.

Referring to FIGS. 4A to 4C, the ISP 130 generates the images and metadata to the AP 140 at every frame period as shown in FIG. 4A. The image can be the viewing image and further include the compressed image. In the following, the description is made using an example in which the image of FIG. 4A is composed of the viewing and compressed images. In this case, the frame information generated by the ISP 130 at every frame includes the YUV image, the JPEG image, and shooting information (embedded data or metadata) as shown in FIG. 4B, and the multiplexer 350 multiplexes the YUV and JPEG images and metadata and transfers the multiplexing result to the AP 140.

As shown in FIG. 4B, the JPEG data as the compressed image is the source image and data to be stored as a still image in response to a capture request. At this time, the size of the JPEG data can be determined by the image sensor 220 of the camera unit 110 to be equal to or greater than, for example, 8M bytes. In the exemplary embodiment of the present invention, the image output by the camera unit 110 may have the data size equal to or higher than Ultra High Definition (UHD) of 8M bytes. The YUV data is the image to be displayed on the display unit 160 or to be stored as a moving image in the moving image shooting mode. The viewing image for the preview mode is scaled to be smaller than the image output by the camera unit 110, and the image for use in the moving image shooting mode has the data size between the image output by the camera unit 110 and the viewing image for the preview mode. The YUV data can be used as post view data as well as preview data. That is, the viewing images stored in the viewing image buffer 383 can be displayed on the display unit 160 as a post view in response to the capture request. The metadata is the supplementary function information of the camera device and includes information generated while the camera unit 110 takes images and information acquired by the sensor unit 120. At this time, the metadata can be stored separately from the compressed image. The ISP 130 is capable of using the information acquired by the camera unit 110 and the sensor unit 120 to generate the metadata formatted as shown in Table 1, and the metadata is stored in association with the viewing and compressed images in a single frame. In particular, the metadata can be stored in synchronization with the moving image frame by frame in the moving image shooting mode. Afterward, the user is capable of playing/displaying and editing the images efficiently using the metadata in the moving image playback mode.

According to the exemplary embodiment of the present invention, the camera frame data structured as shown in FIG. 4B is generated by the ISP 130 and transmitted to the AP 140 in the transfer format as shown in FIG. 4C. For example, the image output by the camera unit 110 has the UHD (8M bytes) size, the YUV data has the size of 2 MB (Full HD: 1920*1080*2 (YUV422 format is 2 Byte per pixel)) in the preview mode and up to 8M bytes in the moving image shooting mode, the JPEG data may have a size up to 8 MB, and the metadata as shooting information has the size of 4 KB. In this case, the bus bandwidth necessary for the ISP 130 to transmit each frame data becomes (1920*1080*2+8*1024*1024+4*1024)*30 fps*8 bits=3,009,576,960 bps=2.87 Gbps. It is preferred that the data size of the viewing image used in the moving image shooting mode is greater than the data size of the viewing image used in the preview mode. This is because the viewing image used in the moving image shooting mode is the image to be stored in the form of a moving image. Accordingly, the bandwidth for the moving image shooting mode can be varied according to the size of the viewing and compressed images. At this time, if the viewing image is set to 4 MB and the compressed image is set to max 4 MB, the bandwidth for the moving image shooting mode becomes equal to the bandwidth for the preview mode. The viewing and compressed images and metadata transmitted, as compressed, by the ISP 130 are decompressed by the demultiplexer 355 of the AP 140, parsed into the viewing image, compressed image, and metadata by the parser 370, and buffered by the respective viewing image buffer 383, compressed image buffer 385, and metadata buffer 387. The buffer 380 is structured, for example, in the form of a ring buffer and thus overwritten with the data buffered as much as the predetermined number of frames.

If a capture request is generated by the input unit 170, the AP 140 uses the compressed images buffered in the compressed image buffer to achieve zero shutter lag, checks the buffered frame images to select a user-intended compressed image, and stores the user-intended compressed image with the metadata. If the capture request command is detected, the AP 140 selects the compressed image buffered at the previous frame among the images buffered in the compressed image buffer 385 and stores the selected image in the storage unit 150. If the capture request command is detected in the state that the shutter lag is set to one frame, the application processing controller 360 selects a first JPEG image, which may be labeled the JPEG1 image, buffered in the compressed image buffer, and selects first metadata, which may be labeled metadata1, and stores the selected JPEG1 image and the metadata1 in the storage unit 150. At this time, a first YUV image, which may be labeled YUV1, and the metadata having the same frame count value as the JPEG1 image may be stored too. Since the compressed image corresponding to the frame proceeding the time when the capture request is detected (shutter release time) among the compressed images of the frames buffered previously in the compressed image buffer 385 is selected and stored in response to the capture request, it is possible to accomplish the zero shutter lag.

If a moving image shooting request is input, the MPEG codec 390 encodes the viewing images being buffered in the viewing image buffer 383, and thus compresses the viewing images into a moving image and stores the moving image in the storage unit 150. At this time, the application processing controller 360 stores the metadata being buffered in the metadata buffer 387 in the storage unit 150 according to a predetermined shooting condition, and at this time, the moving image and the metadata are synchronized by a frame count value. At this time, it is possible to configure the conditions for regenerating the metadata in the moving image shooting mode in advance such that the information output by the metadata buffer 387 or the difference from the previous information is stored according to the shooting condition, whether the metadata includes a thumbnail image can be configured, and whether the thumbnail image is compressed if the thumbnail image is included. Once the shooting conditions of the moving image metadata are configured, the AP 140 encodes, compresses, and stores the viewing image and regenerates the metadata of the moving image frames according to the moving image shooting condition. If the moving image playback request is generated, the application processing controller 360 transfers the moving image stored in the storage unit 150 to the MPEG codec 395 such that the decoded moving image is played on the display unit 160. At this time, if a moving image editing command is input through the input unit 170, the application processing controller 360 is capable of editing the moving image using the metadata and thumbnail images per respective timestamps and playing the metadata or a selected part of the metadata on the display unit 160 along with the moving image.

As aforementioned, FIGS. 1 to 3 show the configuration of the camera device according to the exemplary embodiment of the present invention. Here, the ISP 130 processes the image output by the camera unit 110, controls the operation of the camera unit 110, and executes the function of acquiring the metadata of the camera unit 110. Here, the sensor unit 120 is connected to the ISP 130 and generates the metadata with the information acquired by the camera unit 110 and the sensor unit 120 while the camera is operating. The AP 140 controls the operation of the ISP 130 and processes the data (viewing and compressed images and metadata) output by the ISP 130.

The AP 140 is also capable of processing data from other applications as well as the application of the ISP 130 (i.e. the camera-related application). Such applications can include the applications of the sensor unit 120. The sensor unit 120 may include a GPS module for positioning the device (here, the camera device or the terminal apparatus including the camera device) based on a received GPS signal. The sensor unit 120 may include a motion sensor and a display for displaying the status of the camera device. For example, the motion sensor is capable of sensing the vertical and horizontal movement of the device, and the gyro sensor is capable of sensing the axial (X, Y, and Z axes) movement of the camera device. Accordingly, the AP 140 is capable of controlling the application for collecting the output of the motion sensor and indicating the status of the device based on the output of the sensor unit 120. In this case, the sensor unit 120 is capable of connecting to the AP 140.

Figure 5:
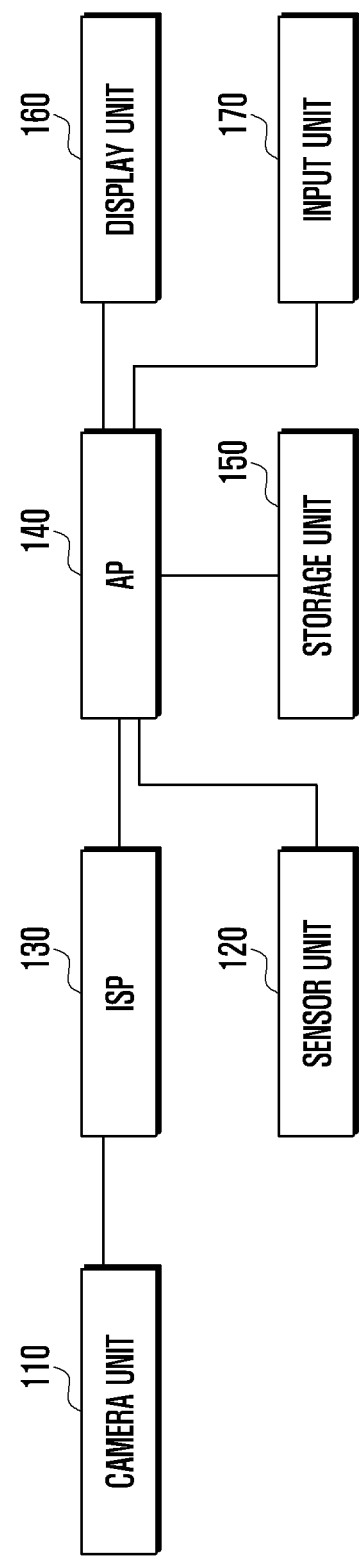
FIG. 5 is a block diagram illustrating the configuration of the camera device or terminal apparatus including the camera device according to the exemplary embodiment of the present invention.
Figure 6:
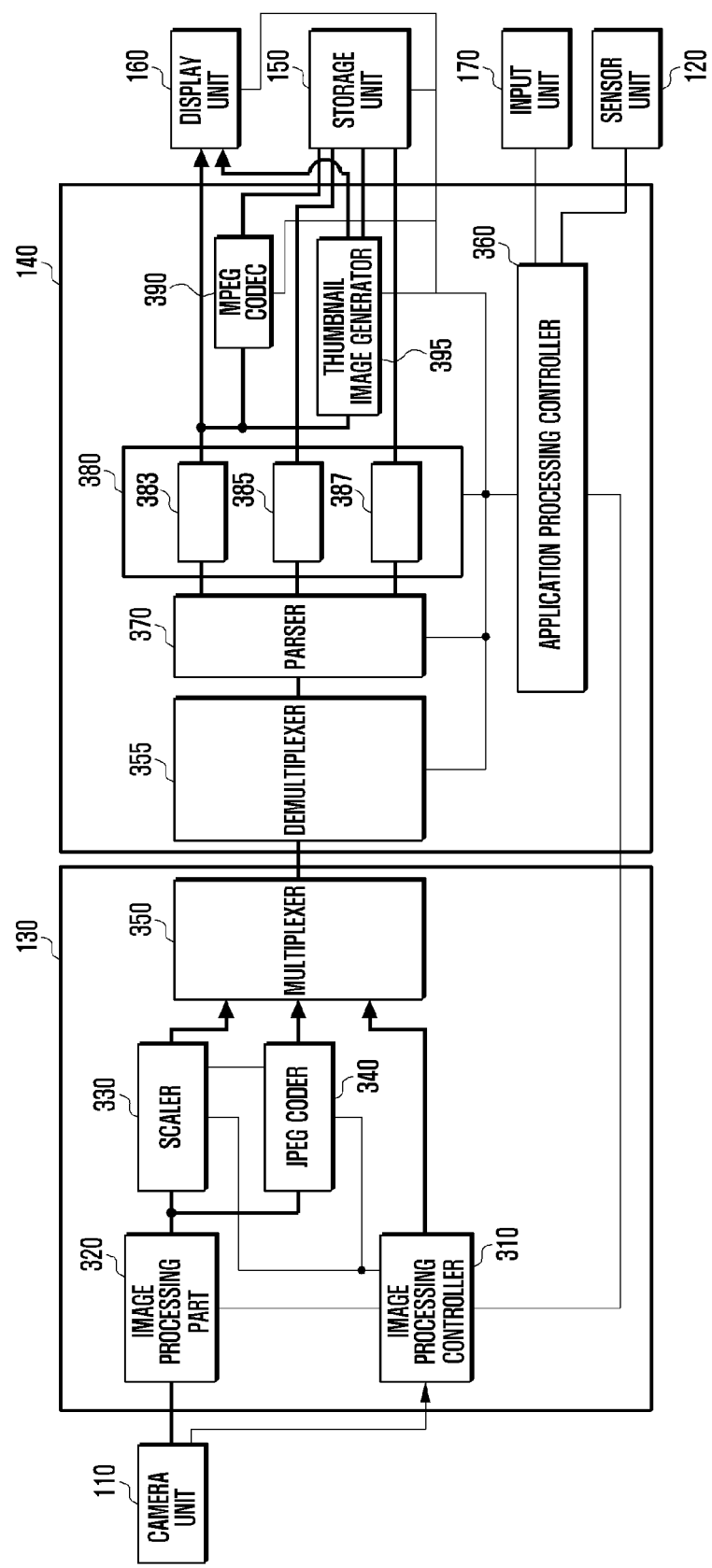
FIG. 6 is a block diagram illustrating the configuration of the ISP and AP of the apparatus of FIG. 5.

FIG. 5 is a block diagram illustrating the configuration of the camera device or terminal apparatus including the camera device in which the AP 140 processes the output of the sensor unit 120 according to the exemplary embodiment of the present invention, and FIG. 6 is a block diagram illustrating the configuration of the ISP 130 and AP 140 of the apparatus of FIG. 5. In the following, the description is directed to the metadata generation and processing operations when the camera device is operating. Other operations with the exception of the metadata generation and processing operations are identical with those described with reference to FIGS. 1 and 3.

Referring to FIGS. 5 and 6, if a camera driving command is input by the user through the input unit 170 (i.e. if the preview mode is executed), the application processing controller 360 notifies the ISP 130 of the input command, and the image processing controller 310 drives the camera unit 110. The image output by the camera unit 110 is input to the image processing part 320.

At this time, the ISP 130 generates the viewing and compressed images and metadata at a frame period. The image processing part 320 performs 3A processing, color interpolation, and/or YUV converting on the raw image input from the camera unit 110. The JPEG coder 340 encodes and compresses the image output by the image processing part 320 into a JPEG format to generate the compressed image to be stored in response to the capture request, and the scaler 330 scales the image output by the image processing part 320 to generate the viewing image having a predetermined size. As aforementioned, if the image processing part 320 is not configured with the color conversion function, the scaler 330 can be configured as a viewing image generation unit. In this case, the viewing image generation unit may include the color conversion function (conversion from a raw image to a YUV image) and scaler function. The ISP 130 is capable of outputting the shooting information of the corresponding frame image taken by the camera unit 110 when the ISP 130 generates the viewing and compressed images at every frame period. In this case, the image processing controller 310 of the ISP 130 generates the metadata with the configuration information of the operation of the camera unit 110 and the information acquired from the camera unit 110 while the camera is operating. That is, in the apparatus configured as shown in FIGS. 5 and 6, the ISP 130 generates the metadata using only the control information of the camera unit 110 and the information acquired from the camera unit 110 (hereinafter, referred to as first shooting information).

The ISP 130 generates the YUV image, the JPEG image, and first shooting information at every frame period, and the multiplexer 350 multiplexes the YUV image, the JPEG image, and the metadata or first shooting information, and transfers the multiplexing result to the AP 140 as shown in FIG. 4A.

Here, the camera device and the terminal apparatus equipped with the camera device may be a portable device carried by the user. The apparatus is mobile such that its location changes according to the area where the user roams, its mobility changes according to how the user moves (by car, airplane, or train, or on foot), its altitude changes according to the user's location (rooftop or basement of building, mountain top, or sea), its posture changes according to the user's behavior (movement in vertical or horizontal or x, y, or z axial direction), and its orientation changes (east, west, south, and north). The camera device or the terminal apparatus equipped with the camera device may include the sensor unit 120 for detecting the aforementioned properties, and the sensor unit 120 may include various sensors. The sensor unit 120 may include a GPS receiver for detecting the location, area, and mobility of the terminal apparatus or camera device, a movement sensor (an acceleration sensor, a gyro sensor, etc.) for detecting the movement of the terminal, an altitude sensor for measuring the altitude of the terminal apparatus or camera device, an orientation sensor for detecting the orientation of the terminal apparatus or camera device, a illumination sensor for sensing the ambient brightness, etc. The camera device or the terminal apparatus equipped with the camera device is also capable of receiving weather and temperature information and other supplementary information through the Internet or other communication networks when the camera device is operating. For this purpose, the camera device or the terminal apparatus equipped with the camera device may include a communication unit, e.g. a Wi-Fi module, to connect to the communication network or the Internet. The information acquired by the sensor unit 120 and/or communication unit, when the camera device is running, is referred to as the second shooting information.

The viewing and compressed images and the first shooting information transmitted by the ISP 130 as multiplexed are demultiplexed by the demultiplexer 355 of the AP 140 and parsed into the viewing images, compressed images, and shooting information by the parser 370, and buffered in the viewing image buffer 383, compressed image buffer 385, and metadata buffer 387 respectively. At this time, the application processing controller 360 of the AP 140 generates the second shooting information with the output of the sensor unit 120 (and/or supplementary information received through a communication unit) and merges the parsed first shooting information with the second shooting information into the metadata structured as shown in Table 1. That is, the AP 140 merges the second shooting information generated by the AP 140 with the first shooting information transmitted by the ISP 130 at every frame such that the merged shooting information is buffered in the metadata buffer 387. At this time, the buffer 380 is configured. for example, in the form of a ring buffer, and if the data corresponding to a predetermined number of frames is buffered, the data is overwritten. The frames of the viewing image buffer 383, the compressed image buffer 385, and the metadata buffer 387 are synchronized among each other using the frame count value. Accordingly, the application processing controller 360 checks the frame count value to process the viewing image, the compressed images, and the metadata per frame.

The application processing controller 360 also controls such that the viewing image is buffered in the viewing image buffer 383 while being displayed on the display unit 160 as preview image. If a user's capture request command is input in the above state, the application processing controller 360 detects the command and stores the compressed image selected according to the configuration among the compressed images buffered in the compressed image buffer 385. In the case that the zero shutter lag function is configured, the AP 140 selects the compressed image of the frame at the time when the capture command is detected (i.e. when the user has checked on the display unit 160 or a view finder) and stores the selected image.

If a moving image shooting command is input, the application processing controller 360 checks the shooting condition and then encodes and compresses the viewing images buffered in the viewing image buffer 383 and processes the metadata buffered in the metadata buffer 387 so as to be stored in the storage unit 150 simultaneously. At this time the viewing image buffered in the viewing image buffer 383 may have a pixel number different from that of the viewing image for use in the preview mode. In this case, the application processing controller 360 notifies the image processing controller 310 of the execution of the moving image shooting mode, and the ISP 310 controls the scaler 330 and the JPEG coder 340 to adjust the size of the viewing image and/or the compressed image. For example, the ISP 130 compresses the image output by the camera unit 110 to generate the compressed image and scales the image output by the camera unit 110 to the size of, for example, one-fourth scale, to generate the viewing image in the preview mode, while the ISP 130 scales the image output by the camera unit 110 to the size of one half and compresses the scaled image to generate the compressed image and scales the image output by the camera unit 10 to the size of one half to generate the viewing image. In this case, it is possible to increase the image resolution of the moving image to be stored to 8M bytes while equally maintaining the bandwidths in the preview mode and the moving image shooting mode. For example, the image output by the camera unit 110 has the size of 8M bytes, the viewing image has the size of 2M bytes while the compressed image is obtained by compressing the image of 8M bytes in the preview mode; and the viewing image has the size of 4M bytes while the compressed image is obtained by compressing the image of 4M bytes. In this case, the scaler 330 generates the viewing image having the size determined according to the operation mode under the control of the ISP 130, and the JPEG coder 340 is capable of configuring the frame with different sizes to be compressed.

The application processing controller 360 encodes and compresses the viewing images and generates the metadata according to the configured shooting condition to be stored simultaneously in the moving image shooting mode. At this time, the shooting condition can be of storing the original metadata or a difference between adjacent frames and may indicate whether the metadata includes thumbnail images.

The resolution of the moving image can be adjusted in the moving image shooting mode and/or the moving image playback mode. That is, the AP 140 is capable of analyzing the metadata of every frame to adjust the video quality automatically in the moving image shooting mode or playback mode. The AP 140 is capable of analyzing the frame metadata to perform the fine video quality adjustment function with specific metadata (EV, metering, face detection, etc.) in the moving image shooting mode and adjusting the playback video quality using the metadata logged with the moving image in the playback mode. The metadata can be used for editing the moving image according to the user request in the playback mode, displayed with the moving image in the form of a caption, and used to extract specific shooting information (e.g. tracking a path of the user based on the location information).

Figure 7:
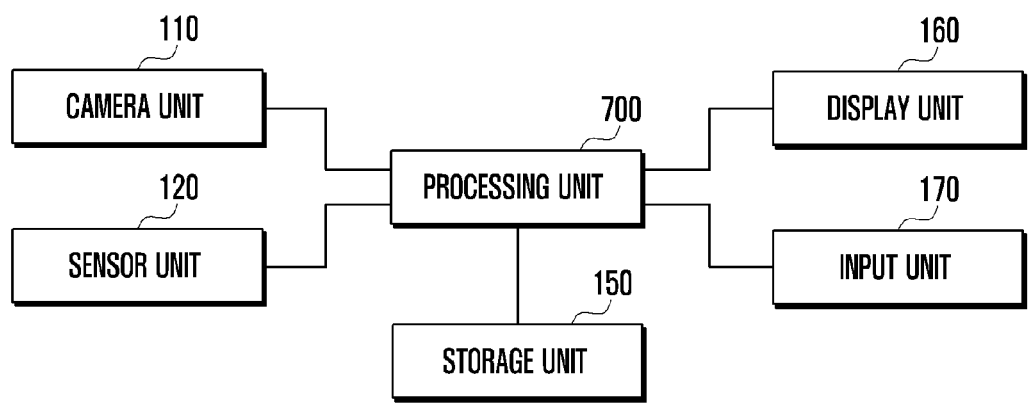
FIG. 7 is a block diagram illustrating the configuration of the camera device with an integrated image and application processor according to the exemplary embodiment of the present invention.

The camera device structured as shown in FIGS. 1 and 3 or 5 and 6 includes the ISP 130 and the AP 140 to process the image taken by the camera unit 110. However, the ISP 130 and the AP 140 can be integrated into a signal processing unit. FIG. 7 is a block diagram illustrating the configuration of the camera device with an integrated image signal processor (ISP) and application processor (AP) according to the exemplary embodiment of the present invention, and FIG. 8 is a block diagram illustrating the configuration of the integrated image signal processor and application processor of FIG. 7.

Figure 8:
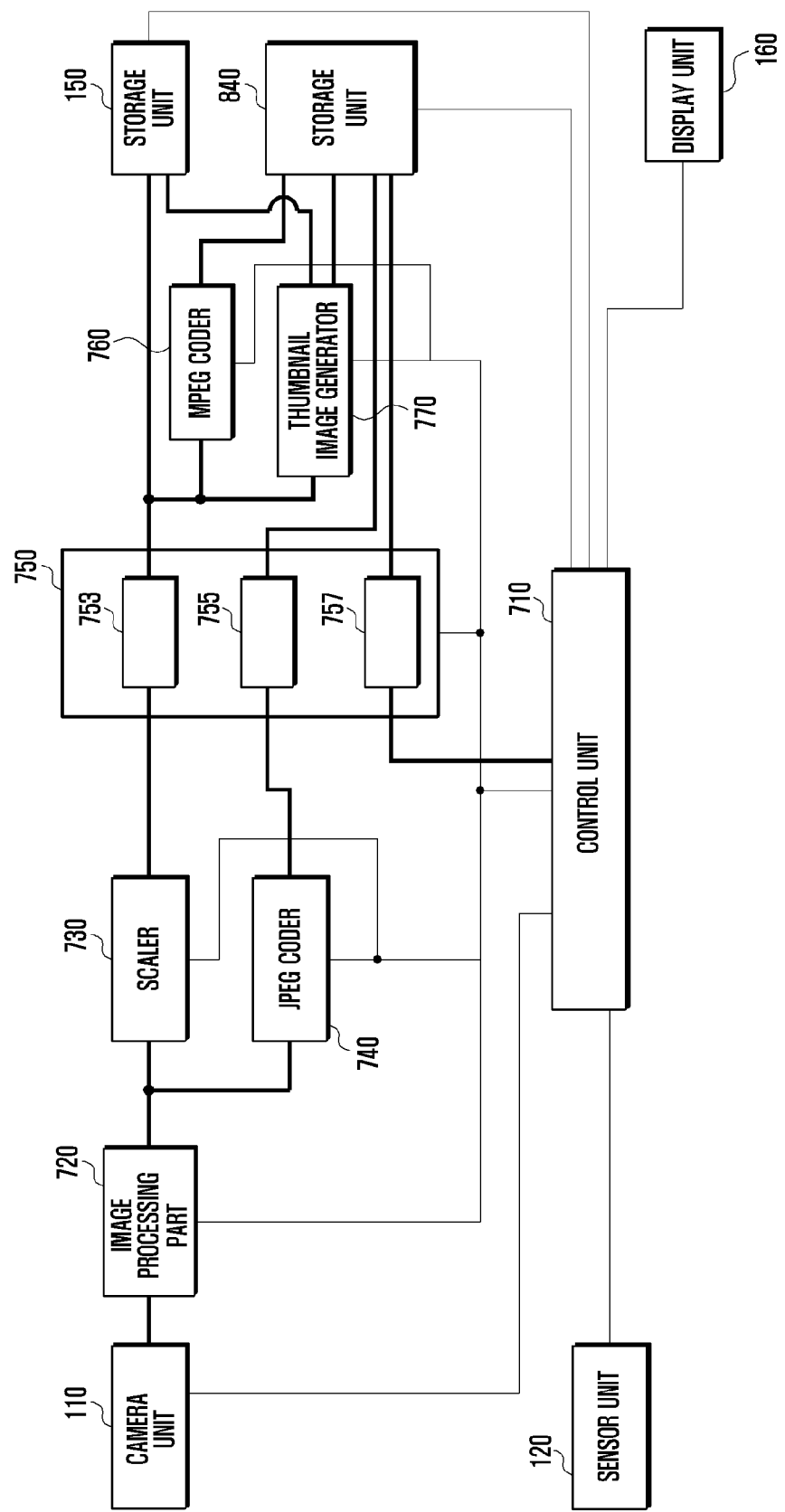
FIG. 8 is a block diagram illustrating the configuration of the integrated image and application processor of FIG. 7.

Referring to FIGS. 7 and 8, the camera unit 110 shoots an external image when the camera powers on, and the sensor unit 120 is mounted on or included in the camera device and includes at least one of a GPS receiver, a gyro sensor, an acceleration sensor, an altitude sensor, and a direction sensor as aforementioned.

The processing unit 700 processes the images acquired from the camera unit 110 to generate the viewing and compressed images and metadata which are buffered. The processing unit 700 is configured to integrally perform the functions of the ISP 130 and the AP 140 of the embodiments of FIGS. 1-3 or FIGS. 5-6. The processing unit 700 generates the viewing and compressed images and metadata at every frame period and buffers the images and metadata in a single frame.

The input unit 170 is capable of generating a camera driving command, a capture command, and a moving image shooting command to the processing unit 700. The input unit 170 is also capable of generating a command to request for displaying the metadata and/or thumbnail images for performing moving image editing or supplementary function in response to the user request in the moving image playback mode. The display unit 160 displays the viewing image output by the processing unit 700 in the preview mode and moving image shooting mode. The display unit 160 is capable of displaying the metadata and/or thumbnail images output by the processing unit 700 in the image capture mode. Here, the input unit 170 can be a touch panel capable of sensing a touch input of the user, and the display unit 160 can be an LCD or OLED panel for displaying the data and image generated in association with the operation of an application. Here, the input unit 170 and the display unit 160 can be integrated into a touchscreen. The input unit 170 may include buttons arranged on or extending from an exterior of the camera device.

The storage unit 150 stores the compressed images being buffered in the processing unit 700 in response to the capture request and stores the moving image and the metadata corresponding to the moving image in the moving image shooting mode.

As shown in FIG. 8, the processing unit 700 excludes a component or part for multiplexing and transferring the frame images and metadata from the ISP 130 to the AP 140, a component or part for demultiplexing the received multiplexed images and metadata, and a component or part for parsing the demultiplexed images and metadata. The other function blocks and operations thereof are identical with those components of FIG. 3 or 6.

That is, the image processed by the image processing part 720 is encoded and compressed by the JPEG coder 740 to be output as a JPEG image and then scaled to a viewing image having a predetermined size. The control unit 710 processes the information acquired from the camera unit 110 and the sensor unit 120 when shooting an image to generate the metadata. At this time, the JPEG image, the viewing image, and the metadata are generated at every frame period, and JPEG and viewing images and metadata generated at the same frame have the same frame count value. Accordingly, the JPEG and viewing images and metadata generated at the same frame are processed as synchronized in a single frame. The JPEG and viewing images and metadata are rebuffered in the respective buffers of the buffer 750 while the viewing image is displayed on the display unit 160 in the form of a preview image.

If a capture request is input, the control unit 710 selects the compressed image of a predetermined previous frame from the compressed image buffer 755 and stores the selected image in a second storage unit 840 so as to achieve zero shutter lag. In the moving image shooting mode, the MPEG codec 760 encodes the viewing image, which is stored in the storage unit 150, to be compressed at every frame, and the control unit 710 processes the metadata at every frame according to a predetermined condition and stores the processed metadata in the storage unit 150. At this time, the predetermined condition may include at least one of the type of metadata (whether there is a difference between frames), whether the thumbnail images are included, and whether the thumbnail images are compressed if the thumbnail images are included. In the moving image playback mode, the MPEG codec 760 decodes the compressed moving image which is displayed on the display unit 160. At this time, the control unit 710 is capable of performing various supplementary functions using the metadata according to the playback command generated by the input unit 170. Here, the supplementary functions may include editing a moving image, processing the metadata in the form of a caption, presenting shooting environment information in moving image playback, playing in a panorama format, performing a closed captioned (CC) TV function, etc.

The camera device according to the exemplary embodiment of the present invention is capable of generating and buffering the images and metadata at every frame in the camera operation mode and accomplishing zero shutter lag using the buffered images in capturing a still image. In the moving image shooting mode, the camera device is capable of storing the moving image and the metadata corresponding to the moving image in synchronization with each other and performing supplementary functions related to the moving image editing and playback. In order to accomplish such synchronization, the camera device and/or the terminal apparatus equipped with a camera is capable of generating and storing the metadata corresponding to the moving image in the moving image shooting mode and logging the metadata, which is relatively small in the amount of data, for a relatively long time. Since the frame rate of the moving image is 30 fps or higher, the metadata difference between two consecutive frames is typically not great. Accordingly, when generating the metadata, the difference (delta) of the shooting information of the current frame and the adjacent (previous) frame can be regenerated as the metadata. The metadata may include thumbnail images. As aforementioned, there may be only a little change between two consecutive thumbnail images. Accordingly, it is possible to include the thumbnail images selected at a predetermined interval in the metadata. The thumbnail images can be YUV images or compressed thumbnail images (e.g. JPEG thumbnail images). In the case of encoding and compressing the thumbnail images, the AP 140 in FIGS. 1-3 and 5-6 may include a codec for encoding the thumbnail images and decoding the compressed thumbnail images (e.g. JPEG coded).

The moving image is stored along with the metadata in the moving image shooting mode and played in various ways using the metadata in the moving image playback mode.

Figure 9:
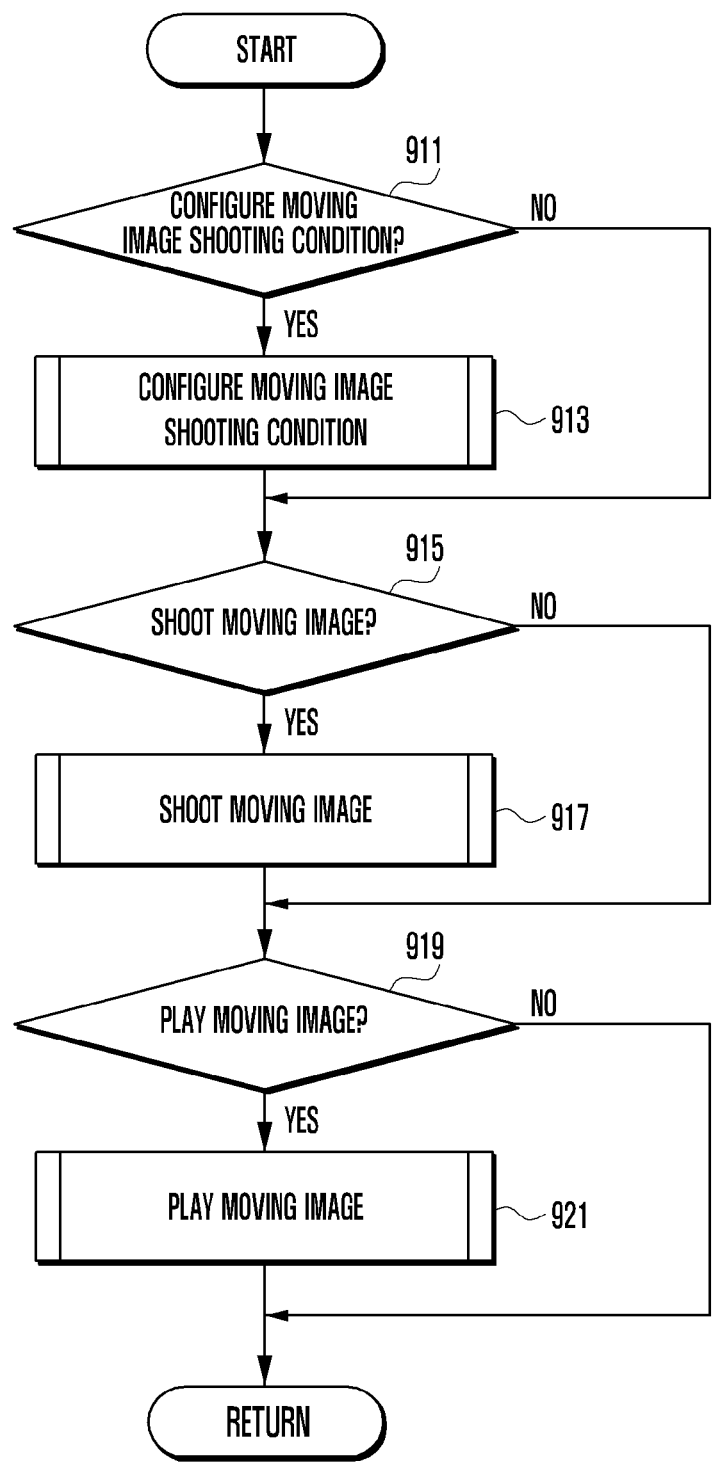
FIG. 9 is a flowchart illustrating a moving image shooting and playback method of the camera device or the terminal apparatus equipped with a camera according to the exemplary embodiment of the present invention.

FIG. 9 is a flowchart illustrating a moving image shooting and playback method of the camera device or the terminal apparatus equipped with a camera according to the exemplary embodiment of the present invention. In the following, the description is made using an example such that the camera device or the terminal apparatus equipped with a camera is configured as shown in FIGS. 5 and 6. The compressed image may not be generated in the moving image shooting mode. In the following description, for example, the compressed image is generated.

Referring to FIG. 9, a moving image shooting condition can be configured for acquiring the metadata in the moving image shooting mode. If a request signal for configuring the moving image shooting condition is input through the input unit 170, the AP 140 detects the moving image shooting condition configuration request signal at step 911 and configures the conditions for acquiring the metadata at step 913, and then the method proceeds to step 915. Here, the moving image shooting conditions may include the type of the metadata, whether to include thumbnail image, and whether to compress the thumbnail image if the thumbnail image is included. The type of the metadata indicates whether the metadata is the whole shooting information or a partial difference between the current frame and the previous frame. However, in step 911, if no request signal is input, the method skips step 913 and proceeds to step 915. If the moving image shooting request is generated in the state that the shooting conditions are configured, the AP 140 detects such generation at step 915 and controls the camera unit 110 using the ISP 130 to perform the moving image shooting operation in step 917. At this time, the ISP 130 processes the image output by the camera unit 110 to generate the viewing and compressed images and processes the setting information of the camera unit 110 and the shooting information output by the camera unit 110 to generate the first shooting information. Afterward, the AP 140 merges the first shooting information and the second shooting information acquired from the sensor unit 120 to generate the metadata. The AP 140 compresses the viewing image into a moving image, which is stored in the storage unit 150, and processes the metadata according to the shooting conditions and stores the processed metadata in the storage unit 150. At this time, the moving image and the metadata are stored as synchronized in a frame. Referring back to step 915, if no shooting request is generated, the method skips step 917 and proceeds to step 919.

If the user selects the moving image to play in the state that the moving image has been recorded completely, the application processing unit 140 detects this selection at step 919 and plays the moving image at step 921, and the method then ends. At this time, the moving image is played by decoding compressed moving image data, and the metadata can be used for editing the moving image or presenting the shooting environment information of the moving image, converting the moving image to other moving image format, or manipulating a specific part of the moving image. Referring back to step 919, if no selection is detected, the method skips step 921 and the method in FIG. 9 then ends.

Steps 913, 917, and 921 are described in detail hereinafter.

Figure 10:
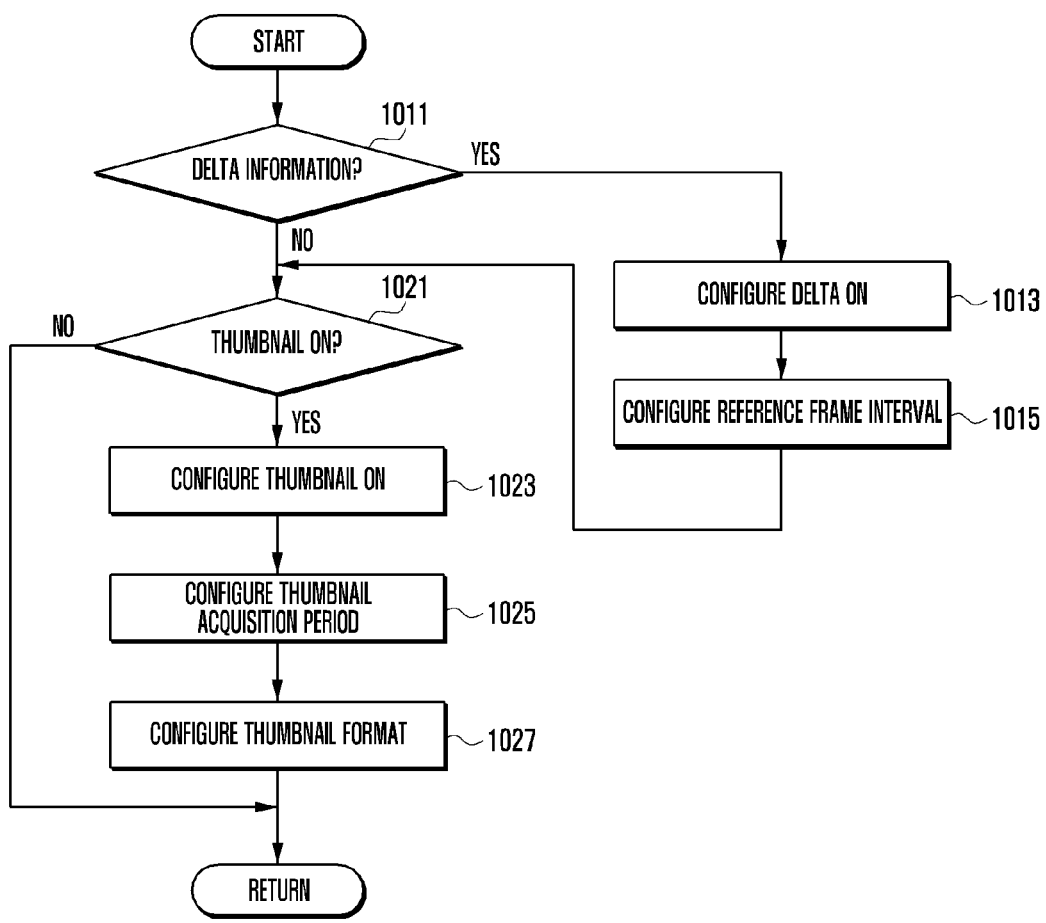
FIG. 10 is a flowchart illustrating the moving image shooting condition configuration procedure of the camera device according to the exemplary embodiment of the present invention.

FIG. 10 is a flowchart illustrating the moving image shooting condition configuration procedure of the camera device according to the exemplary embodiment of the present invention.

Referring to FIG. 10, the AP 140 checks the delta information of the metadata at step 1011. Here, the delta information is defined herein as the information indicating any difference between two consecutive frames, and in the exemplary embodiment of the present invention, the difference between the metadata of the current frame and the metadata of the previous frame. If the AP 140 is not configured to use the delta data in step 1011, the method skips steps 1013-1015, and proceeds to steps 1021. However, if the AP 140 is configured to use the delta data (in a "delta on" state), the AP 140 checks this configuration at step 1011 and thus turns on the delta function at step 1013 and configures the reference frame period at step 1015, and proceeds to step 1021. Here, the delta information is determined in such a way of configuring the difference between the current and previous frame in the moving image shooting mode as the metadata and stores the metadata for the frames in a predetermined duration without extra measurement of the difference information, with the extra measurement being a delta value. This may cause propagation of the error of the delta value at a specific frame to the subsequent frames. Accordingly, in the exemplary embodiment of the present invention, a method for storing the metadata generated by the ISP 130 and AP 140 at a predetermined frame interval without modification is used when the delta information is used. That is, the metadata generated in the above manner is used without modification at the reference frame. The frame at which the metadata is stored without modification is referred to as reference frame. Here, the reference frame may match the Infra frame (I frame) of the moving image frames or may be set to the frame appearing at a predetermined interval (e.g. 50 ms, 1 second, 2, second, 3 second, etc.). However, referring back to step 1011, if the method determines that the delta information is not used, the AP 140 detects such lack of use at step 1011 and stores the metadata generated by the ISP 130 and the AP 140 without modification, and the method proceeds to step 1021. According to the exemplary embodiment of the present invention, the metadata may include the thumbnail image of the corresponding frame. The thumbnail image can be displayed, played, or executed according to the user's selection. Accordingly, if the user requests to include the thumbnail image in the metadata, the AP 140 detects the user selection at step 1021 and sets the thumbnail function indicator to an on state in the metadata at step 1023 and configures a thumbnail image inclusion period at step 1025. That is, the thumbnail image can be included in the metadata of every frame or at an interval of a predetermined number of frames. In the cases that the frame rate is 30 fps or higher, the difference of the metadata or the image between frames may not be great. Accordingly, it may be more efficient to include the thumbnail image at an interval of a predetermined number of frames. Here, the thumbnail image inclusion frame interval can be set to be equal to the I frame interval or a predetermined time interval. The thumbnail image may be stored in a YUV format or another known compressed image format (JPEG format). Referring back to step 1021, in the case that the thumbnail image is not included in the metadata due to the user not requesting to include the thumbnail image in the metadata, the AP 140 detects the lack of a user request at step 1021 and turns off the thumbnail function. The method in FIG. 10 then ends.

Figure 11:
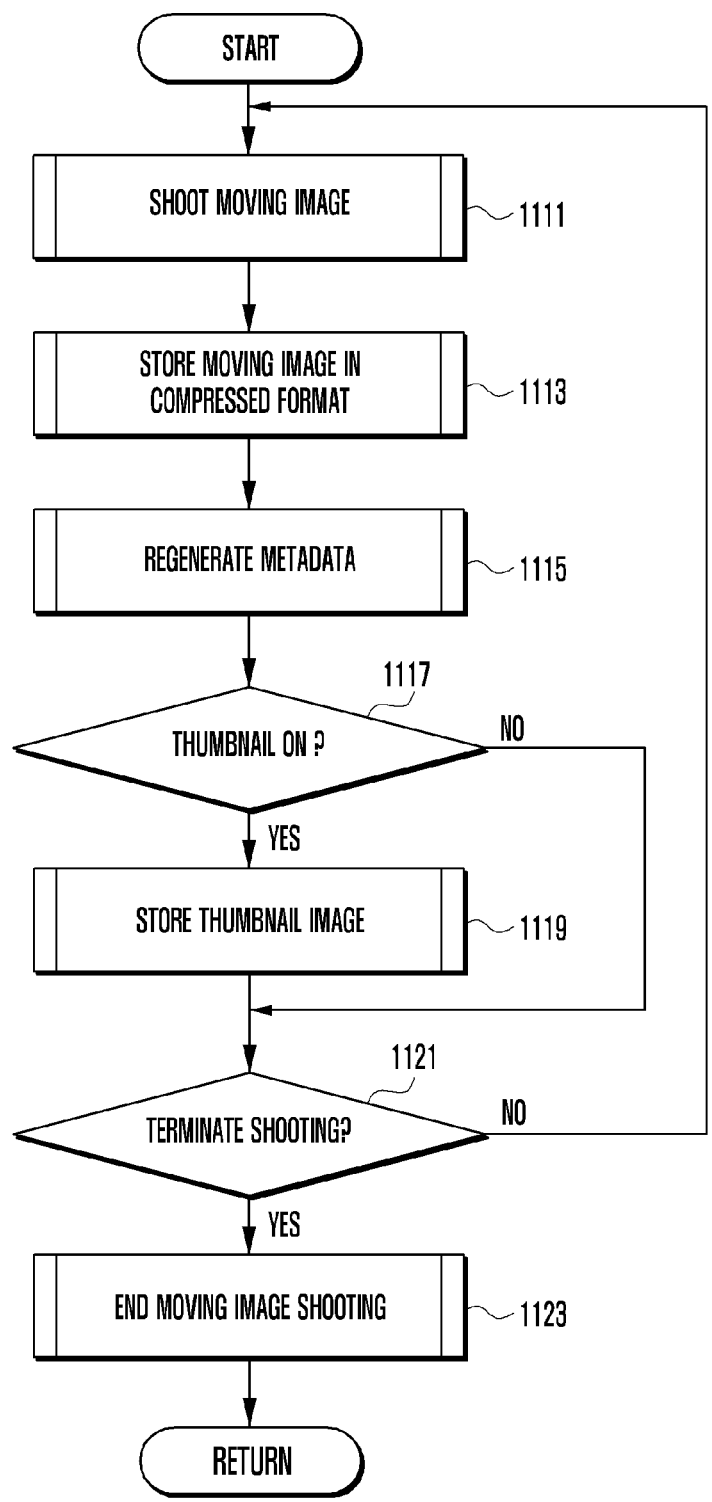
FIG. 11 is a flowchart illustrating a moving image shooting procedure of the camera device according to the exemplary embodiment of the present invention.

FIG. 11 is a flowchart illustrating a moving image shooting procedure of the camera device according to the exemplary embodiment of the present invention. Referring to FIG. 11, the application processing unit 140 performs the moving image shooting procedure in the moving image shooting mode at step 1111 and processes the moving image and stores the processed moving image in the storage unit 150 at step 1113. The moving image shooting and storage procedure can be performed as shown in FIG. 12.

Figure 12:
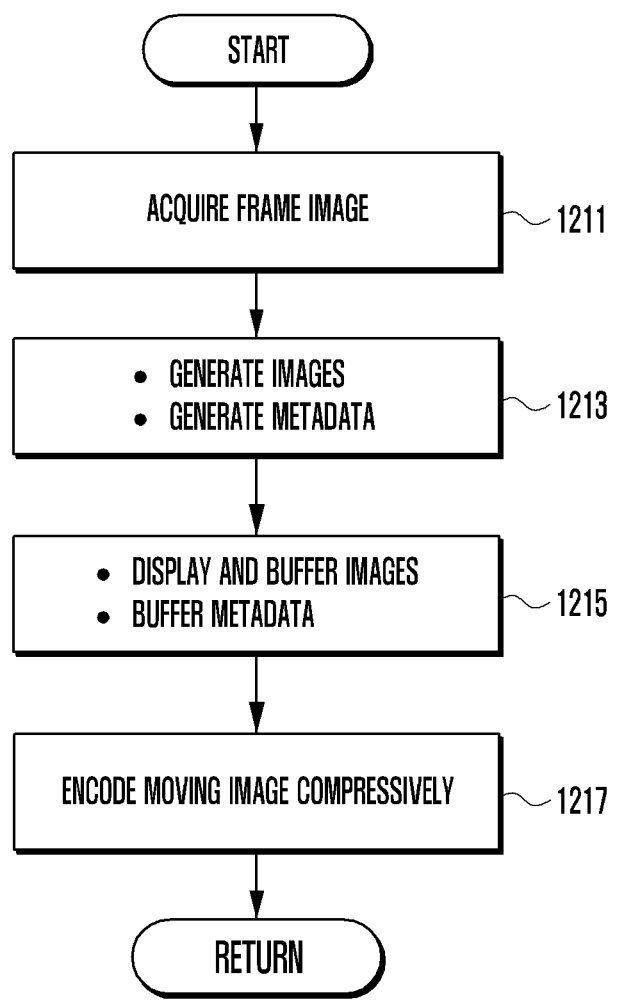
FIG. 12 is a flowchart illustrating the detail of the moving image shooting and storage step of FIG. 11.

FIG. 12 is a flowchart illustrating the detail of the moving image shooting and storage steps of steps 1111-1113 in FIG. 11.

Referring to FIG. 12, the AP 140 requests the ISP 130 to perform the moving image shooting mode. At this time, the viewing images for use in the preview mode and the moving image shooting mode differ from each other in size. In this case, the ISP 130 is capable of configuring the scaler 330 and/or the JPEG coder 340 to configure the sizes of the viewing and compressed images. In order to increase the resolution of the moving image being recorded in the storage unit 150 while maintaining the bandwidth or almost the same bandwidth in the moving image shooting mode (i.e. maintaining the data rate from the ISP 130 to the AP 140 at the same or almost same level), a method for reducing the data size of the compressed image while increasing the resolution of the viewing image in the moving image shooting mode can be used in the exemplary embodiment of the present invention.

In the above described state, the camera unit 110 takes images, and the ISP 130 acquires the frame image at every frame at step 1211 and generates the viewing and compressed images at the corresponding frame and metadata associated with the camera unit 110 (here, the first shooting information) at step 1213. At this time, the frame rate can be 30 fps or higher (e.g. 60 fps). The viewing and compressed images and the first shooting information generated as above are multiplexed to be transferred to the AP 140, and the AP 140 buffers the viewing and compressed images and the first shooting information respectively at step 1215, with the viewing image being displayed on the display unit 160 as preview image. The AP 140 merges the first shooting information and the second shooting information acquired through the sensor unit 120 to generate the metadata which is buffered in the buffer 380.

The AP 140 encodes and compresses the viewing image into the moving image using the MPEG codec 390 at step 1217 and stores (records) the encoded moving image in the storage unit 150. That is, the AP 140 performs the procedure of FIG. 12 to acquire the moving image at step 1111 and stores (records) the compressed moving image signal in the storage unit 150 at step 1113. The method of FIG. 12 then ends and returns to perform step 1115 in FIG. 11.

Referring back to FIG. 11, the AP 140 regenerates the metadata according to the preconfigured moving image shooting conditions and stores the metadata in the storage unit at step 1115. At this time, the moving image signal stored at step 1113 and the metadata generated at step 1115 have to be synchronized in frame, and the frame synchronization can be acquired using the frame count value of the metadata.

Figure 13:
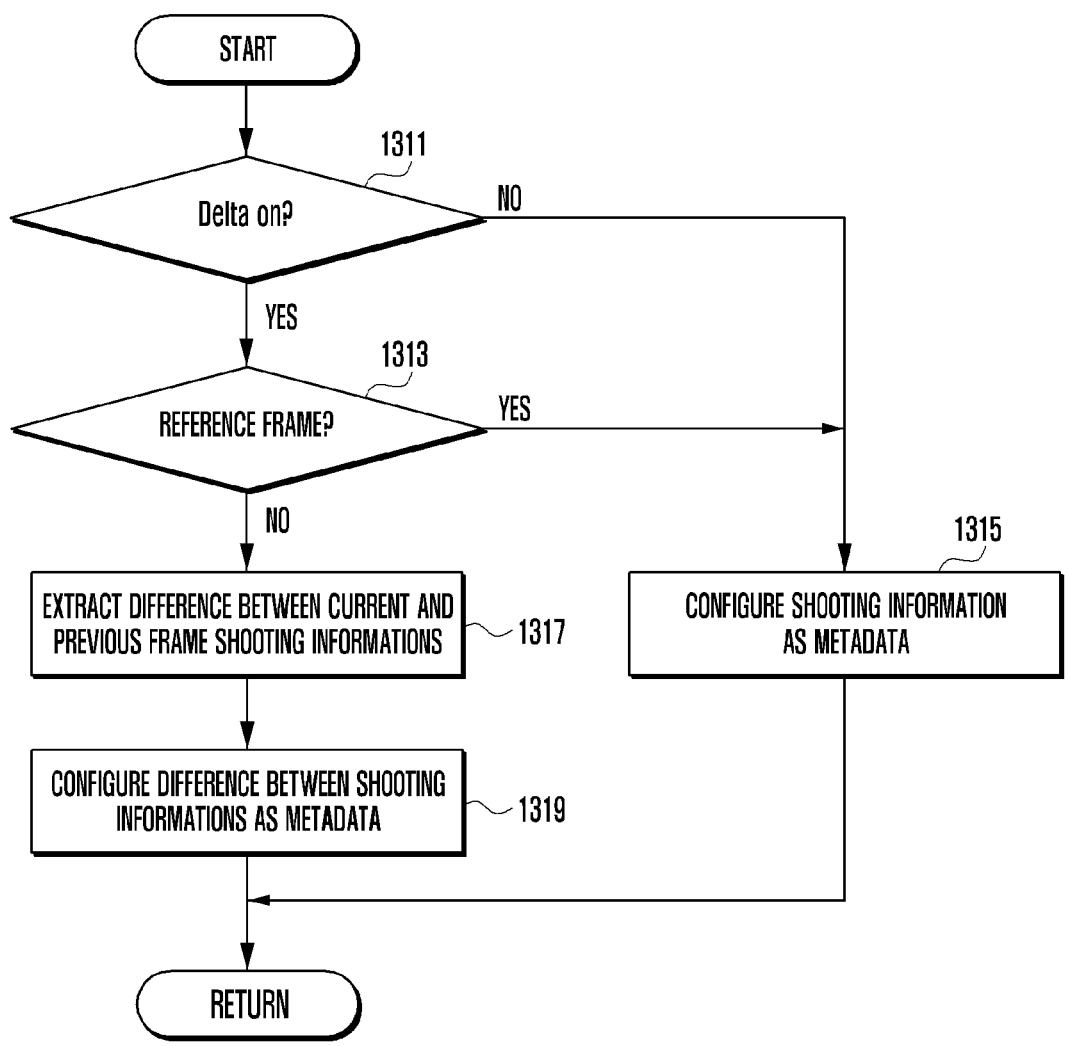
FIG. 13 is a flowchart illustrating the metadata regeneration and storage procedure of the camera device according to the exemplary embodiment of the present invention.
Figure 14:
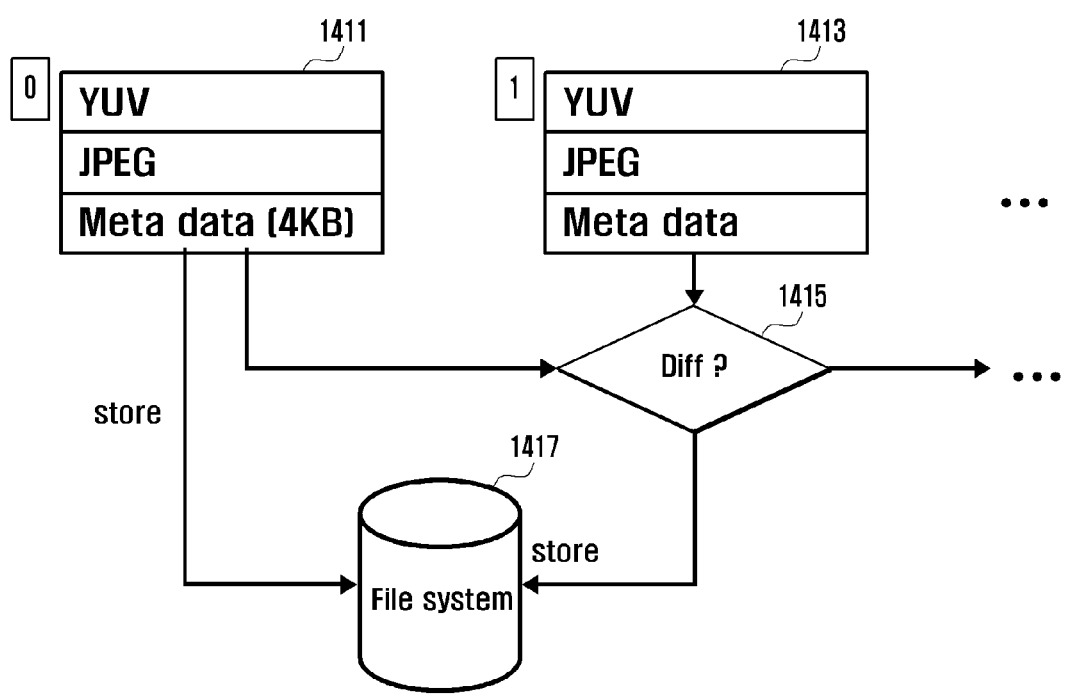
FIG. 14 is a flowchart illustrating the procedure for regenerating the difference information between current and previous frames as the metadata when a delta function is set to on in FIG. 13.

FIG. 13 is a flowchart illustrating the metadata regeneration in step 1115 and a storage procedure of the camera device according to the exemplary embodiment of the present invention. FIG. 14 is a flowchart illustrating the procedure for regenerating the information of a difference between current and previous frames as the metadata when the delta function is set to an on state in FIG. 13.

Referring to FIGS. 13 and 14, the AP 140 determines whether the delta function is turned on at step 1311. If the delta function is turned on, the delta function being on indicates that the difference between the information of the current frame and the adjacent frame is stored as a part of the metadata, and the method proceeds to step 1313. However, if the delta function is set to off, the AP 140 detects the off state at step 1311 and configures the shooting information buffered in the metadata buffer 387 as metadata at step 1315, and the method of FIG. 13 then ends, and returns to perform step 1117 in FIG. 12. Otherwise, in step 1311, if the delta function is set to on, the AP 140 determines whether the current frame is a reference frame at step 1313, and if so, configures the shooting information buffered in the metadata buffer 387 as metadata of the current frame at step 1315. However, referring back to step 1313, if the current frame is not the reference frame at step 1313, the AP 140 checks the information difference between current and previous frames at step 1317 and stores the information difference as the metadata at step 1319. That is, the metadata is regenerated with the difference information between the two frames. The method of FIG. 13 then ends, and returns to perform step 1117 in FIG. 11.

As shown in FIG. 14, if the delta function is set to on and if the current frame is the reference frame 1411, the AP 140 stores the metadata of the current frame in a file system 1417 in the storage unit 150 without modification. As described above, the AP 140 can be configured to store the metadata at a predetermined number of frames such that even though a delta value recovery error occurs in the moving image playback and editing procedure the error can be recovered. The AP 140 accesses the metadata of the current frame 1411, indicated by the frame number 0 in FIG. 14, and the metadata of the previous 1413, indicated by the frame number 1 in FIG. 14, and compares the metadata with each other to check whether there is any difference between the current and previous frames using a difference component 1415 in the AP 140. At this time, the metadata can be structured as shown in Table 1 and thus it is possible to determine whether the metadata match with each other item by item. If there is any difference between the metadata, the AP 140 regenerates the difference information (i.e. a delta value) as the metadata and stores the metadata in a file system 1417 in the storage unit 150. This metadata regeneration procedure can be performed at every frame, and the metadata of every frame can be logged since the data amount of the metadata is relatively large (about 4 Kbyte). As described with reference to FIG. 14, when the amount of data forming the metadata generated with the difference information between frames is very small, it is possible to store all metadata generated at every frame and for a relatively long period.

Figure 15:
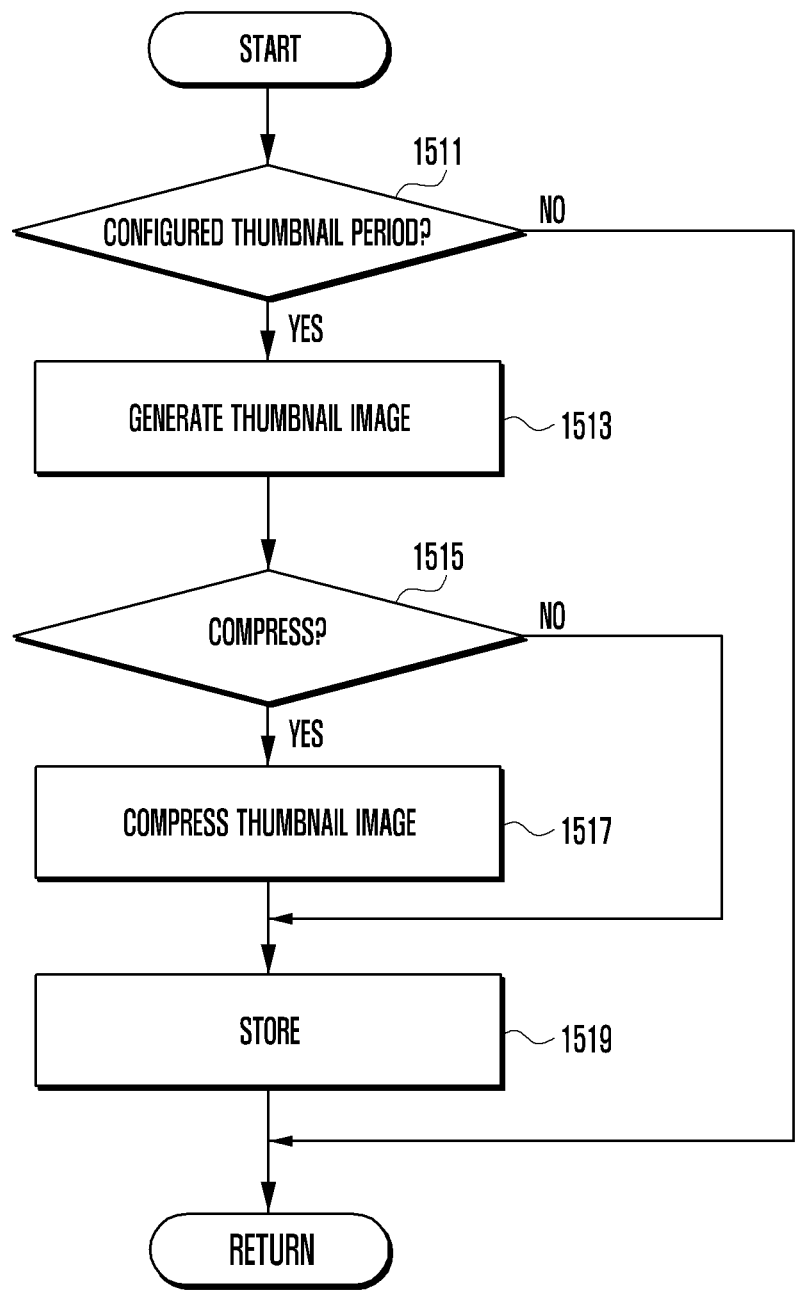
FIG. 15 is a flowchart illustrating the procedure of inserting a thumbnail image into the metadata in FIG. 11.

Referring back to FIG. 11, after regenerating the metadata as described above, the AP 140 determines whether the thumbnail function is set to on at step 1117. Here, if the thumbnail function is set to on, such an on setting indicates that, after the metadata is regenerated according to the method described with reference to FIGS. 13 and 14, the thumbnail image is included in the regenerated metadata. Accordingly, if the thumbnail function is set to on, the AP 140 detects the on state at step 1117 and inserts the thumbnail image into the metadata while performing the procedure of FIG. 15 at step 1119, and then proceeds to step 1121. However, if the AP 140 does not detect the on state at step 1117, the method of FIG. 11 skips step 1119 and proceeds to step 1121. FIG. 15 is a flowchart illustrating the procedure of inserting a thumbnail image into the metadata in FIG. 11, and FIG. 16 is a diagram illustrating the mechanism of processing a thumbnail image under the condition for the case when the thumbnail function is turned on.

Figure 16:
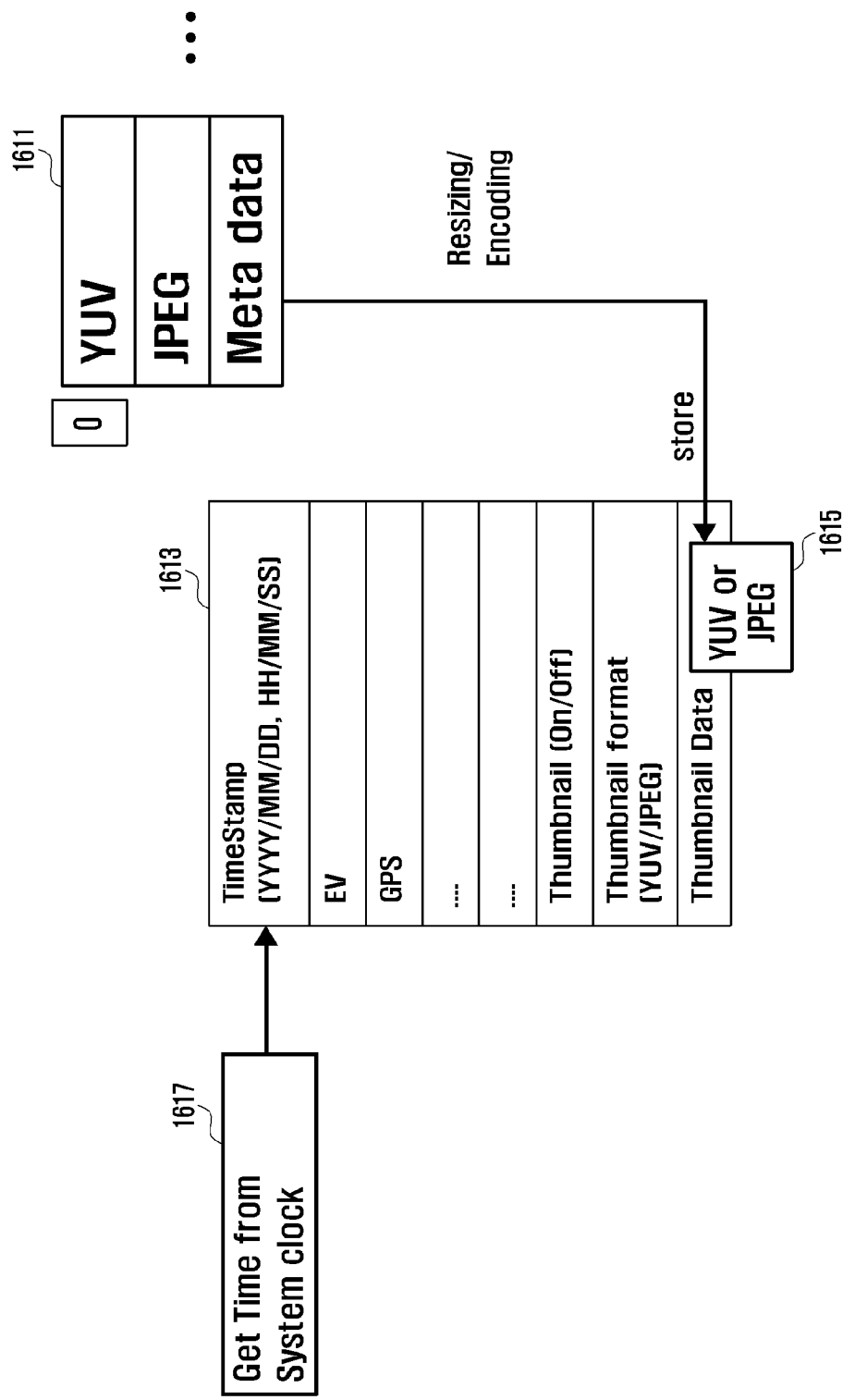

Referring to FIGS. 15 and 16, if the thumbnail function is set to on, as detected in step 1117 of FIG. 11, the AP 140 determines whether the current frame 1611, indicated in FIG. 16 as the current frame by index 0 near the frame, with the frame 1611 having YUV, JPEG, and metadata, is the frame at the thumbnail image insertion period at step 1511. If the frame rate is 30 fps or higher, the difference between the thumbnail images of consecutive frames is not large. Accordingly, it is possible to configure the present invention such that the thumbnail image is included in the metadata at a predetermined number of frames. If the current frame is not the period for thumbnail inclusion, the AP 140 ends the method of FIG. 15, and returns to the procedure of FIG. 11 to control such that the regenerated metadata is stored in the storage unit 150. Otherwise, referring to FIGS. 15-16, if the current frame 1611 is in the period for thumbnail inclusion, the AP 140 controls the thumbnail image generator 395 to generate a thumbnail image at step 1513, determines whether the compression function is configured at step 1515, and, if the compression function is configured, compresses the thumbnail image at step 1517. However, in step 1515, if it is determined that the compression function is not configured, the methods proceeds to step 1519 and skips compressing the thumbnail image in step 1517. The compression option can be configured in the moving image shooting condition configure procedure, and the thumbnail image can be inserted with the metadata in a JPEG or YUV format by resizing and/or encoding, as shown in FIG. 16. The thumbnail image processed into a JPEG or YUV format through steps 1515 and 1517 is included in the metadata stored at step 1519, and the metadata including the thumbnail image is logged as the metadata of the corresponding frame in the storage unit 150. The moving image and metadata stored in the storage unit 150 are synchronized by frame as described above.

The metadata generated at step 1519 can be stored in the structure 1613 of FIG. 16 and logged with reference to the timestamp from the system clock 1617. If the frame is configured to be used as thumbnail image, the thumbnail image generator 395 resizes and/or scales the YUV image of the interleaved data (data transmitted as multiplexed YUV, JPEG, and metadata in a frame) to generate the thumbnail image and includes the generated thumbnail image 1613 in the metadata, with the thumbnail image being a YUV image or a JPEG image 1615. If the thumbnail function is set to on (thumbnail on flag) as described above, the AP 140 is capable of inserting the YUV image resized (and coded) as a thumbnail image into the metadata along with the timestamp at a predetermined period, i.e. at a predetermined number of frames referenced from a metadata logging table. After step 1519, the method of FIG. 15 then ends, and returns to perform step 1121 in FIG. 11.

While repeating the above described operation, the AP performs the procedure of FIG. 12 at steps 1111 and 1113 of FIG. 11 to encode the moving image signal and regenerates and stores the metadata through the procedure of FIGS. 13 to 16 at steps 1115 to 1119. The above described operations are performed at every frame to store the moving image and the metadata in the storage unit 150. Referring back to step 1121 in FIG. 11, if a moving image shooting termination request is input through the input unit 170, the AP 140 detects the termination request at step 1121 and ends the moving image shooting operation at step 1123. The method of FIG. 11 then ends. However, in step 1121, if no termination request is detected, the method loops back to repeat and continue steps 1111-1121 until a termination request is detected.

As described above, if the moving image shooting function is executed, the moving image and the metadata frame-synchronized with the moving image are stored in the storage unit 150. In the moving image playback mode, it is possible to perform editing, previewing, presenting moving image shooting information, and image reconfiguration (image synthesis) based on the video marker, panorama shot, and other shooting information, using the metadata.

Figure 17:
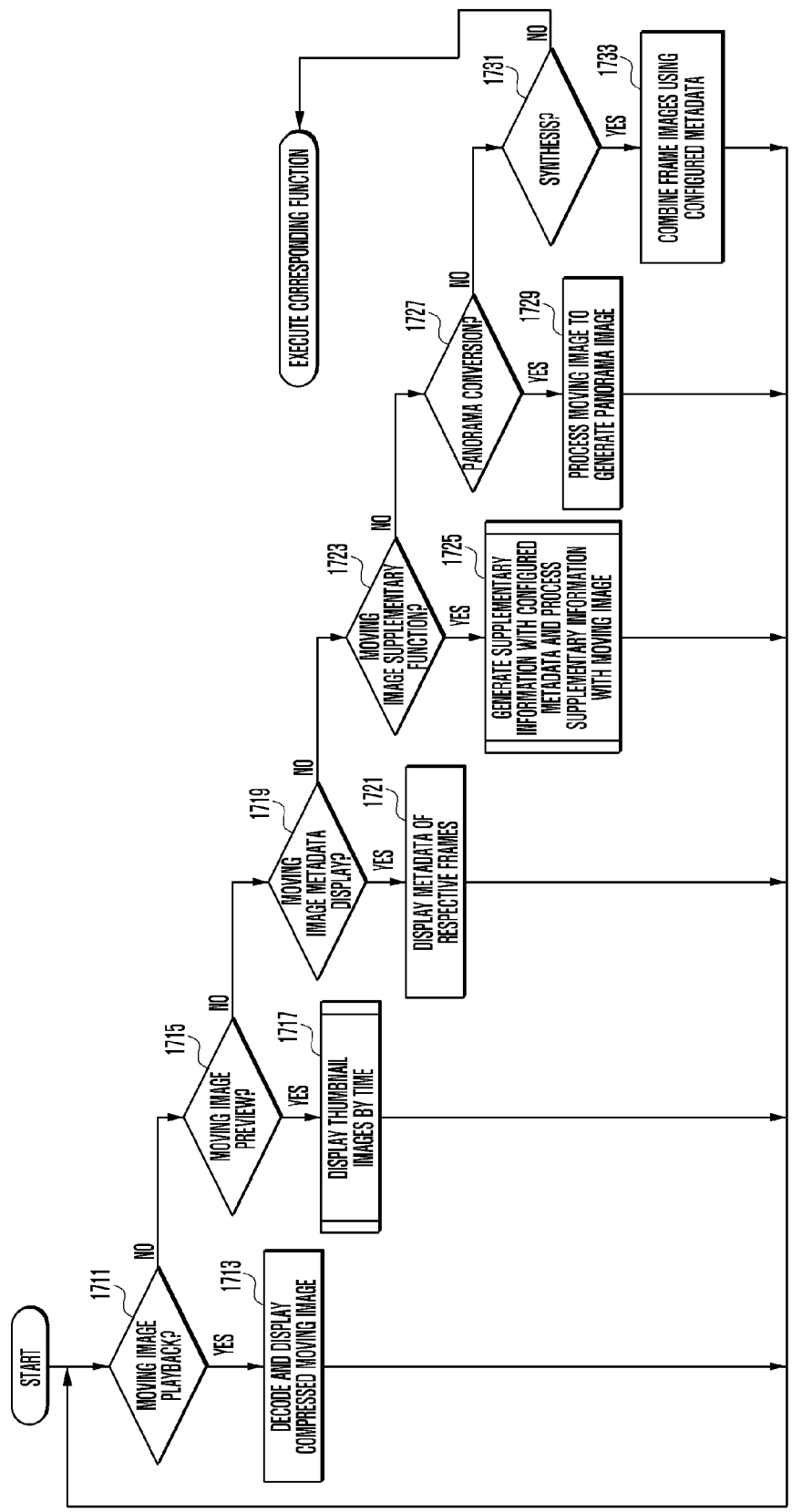
FIG. 17 is a flowchart illustrating the operation procedure in the moving image playback mode according to the exemplary embodiment of the present invention.

FIG. 17 is a flowchart illustrating the operation procedure in the moving image playback mode according to the exemplary embodiment of the present invention.

Referring to FIG. 17, if a moving image playback request is detected at step 1711, the AP 140 accesses the compressed moving image stored in the storage unit 150 at step 1713, decodes the compressed moving image using the MPEG codec 390, and outputs the decoded moving image on the display unit 160 at step 1713. While playing the moving image, it is possible to perform various supplementary functions using the metadata.

However, if no moving image playback request is detected in step 1711, if a moving image preview function is selected with the metadata, the AP detects the selection at step 1715 and displays the thumbnail images in temporal order to perform the preview function at step 1717.

Figure 18:
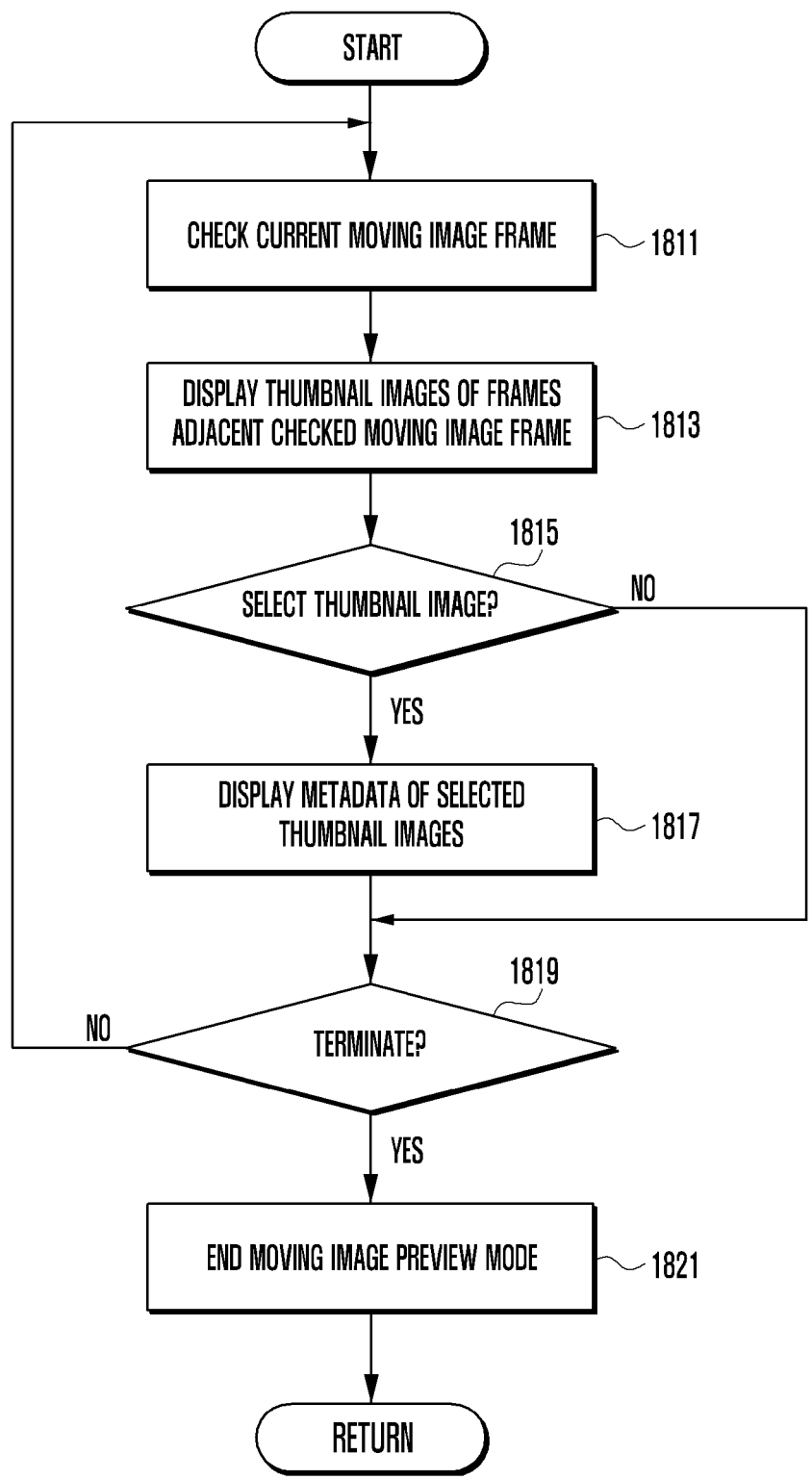
FIG. 18 is a flowchart illustrating the metadata-based moving image preview function execution procedure according to the exemplary embodiment of the present invention.
Figure 19:
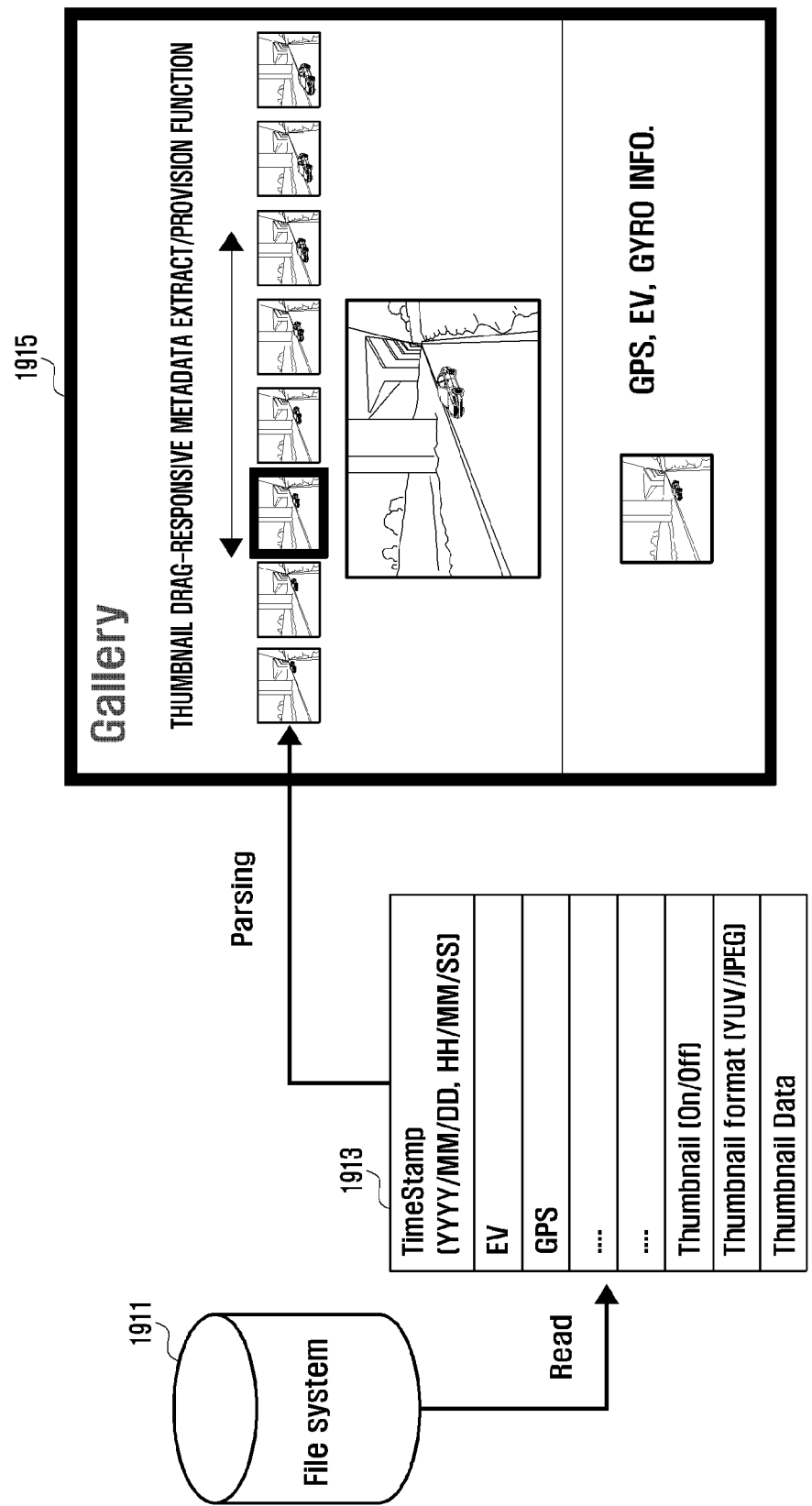
FIG. 19 is a diagram illustrating the principle of the moving image preview operation in association with the procedure of FIG. 18.

FIG. 18 is a flowchart illustrating the metadata-based moving image preview function execution procedure according to the exemplary embodiment of the present invention, and FIG. 19 is a diagram illustrating the principle of the moving image preview operation in association with the procedure of FIG. 18.

Referring to FIGS. 18 and 19, if a moving image preview mode is selected, the AP 140 accesses the method data stored in a file system 1911 of the storage unit 150 at step 1811, checks the current frame 1915 of the moving image at step 1813, and displays the thumbnail images 1915 corresponding to the timestamps. If a touch is made on the screen in the state that the moving image is playing or being displayed, the moving image playback stops such that the current screen image is presented as a still image along with the thumbnails images of the adjacent frames checked by parsing the timestamp of the current frame. If a thumbnail image is selected in the playback-stopped state, as detected in step 1815, the AP 140 is capable of displaying the thumbnail image with the corresponding metadata data in the moving image preview mode in step 1817, and proceeds to step 1819. If a drag search gesture is detected on the thumbnail images 1915 of FIG. 19, the AP 140 is also capable of controlling to additionally display the metadata of the found thumbnail images. At this time, the thumbnail images can be included in the metadata 1913 of FIG. 19, and in this case, it is possible to display the thumbnail image of the corresponding frame quickly retrieved from the metadata.

Referring back to step 1815, if there is no detection of a selection of a thumbnail image, the method skips step 1817 and proceeds to step 1819. The method then checks for a termination command in step 1819, and if no termination command is detected, the method loops back to step 1811 to repeat steps 1811-1819. However, if a termination command is detected in step 1819, the method ends a moving image preview mode in step 1821, and returns to step 1715 in FIG. 17.

Figure 20:
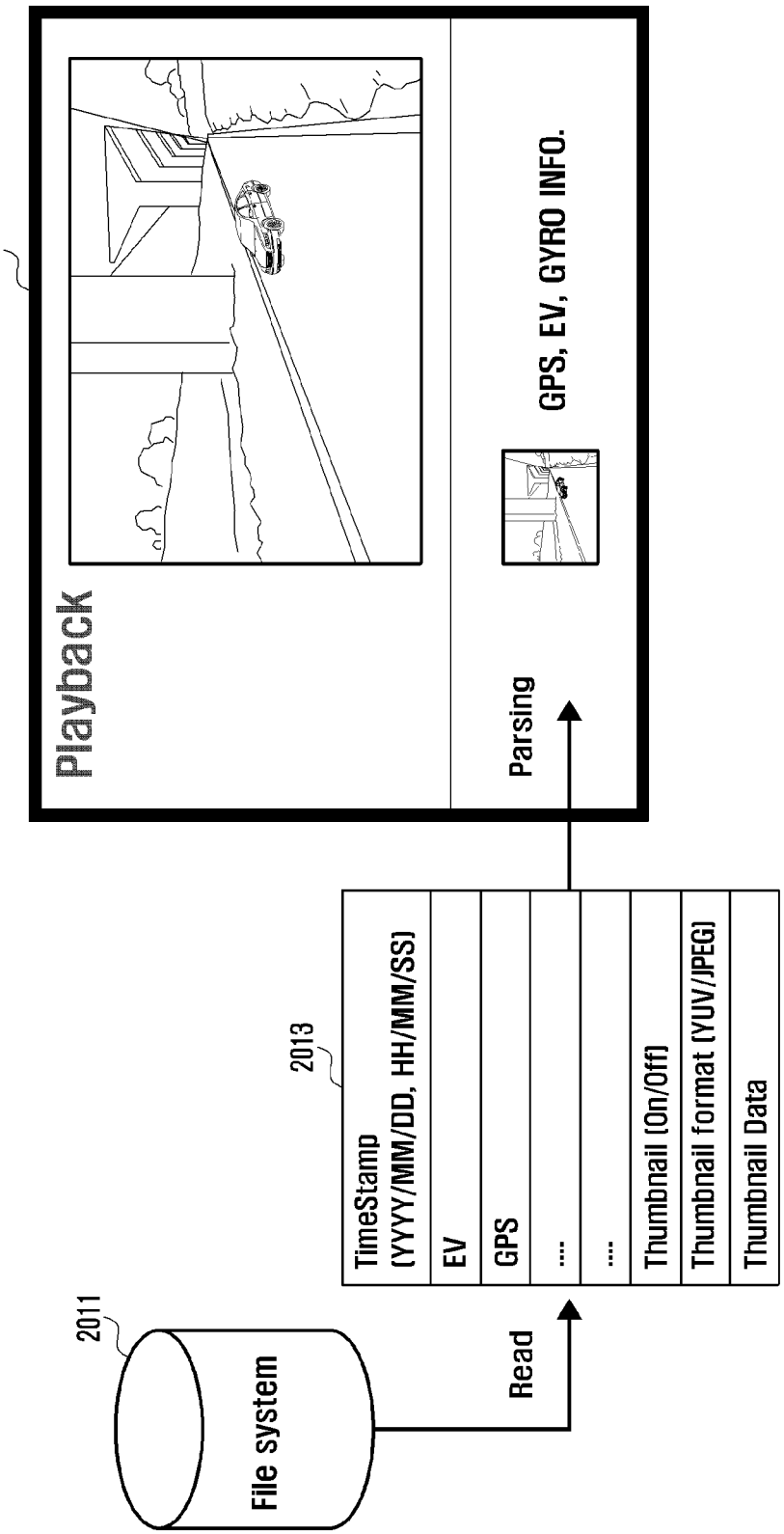
FIG. 20 is a diagram illustrating the principle of displaying the metadata associated with the moving image being played according to the exemplary embodiment of the present invention.

In step 1715, if no moving image preview request is detected, the method detects for a request for the display of moving image metadata in step 1719. The AP 140 is capable of displaying the metadata along with the moving image. FIG. 20 is a diagram illustrating the principle of displaying the metadata associated with the moving image being played according to the exemplary embodiment of the present invention. Referring to FIGS. 17 and 20, if a moving image metadata request is input, the AP 140 detects the input request at step 1719 and displaying the metadata associated with the moving image being played currently at step 1721. That is, if the metadata request is input in the state that a moving image is playing, the AP 140 accesses the metadata stored in a file system 2011 of the storage unit 150 and parses metadata into a thumbnail image and metadata 2013 which are displayed on the display unit 160. As described above, the AP 140 is capable of simultaneously displaying the metadata logged in for playing or editing the moving image and thumbnail image included in the metadata, as shown in the display 2015, and in this case, the metadata associated with the moving image being played currently can be presented in the form of a caption, such as the GPS, EV, and gyro information in a caption below the played back moving image of the display 2015.

Figure 21:
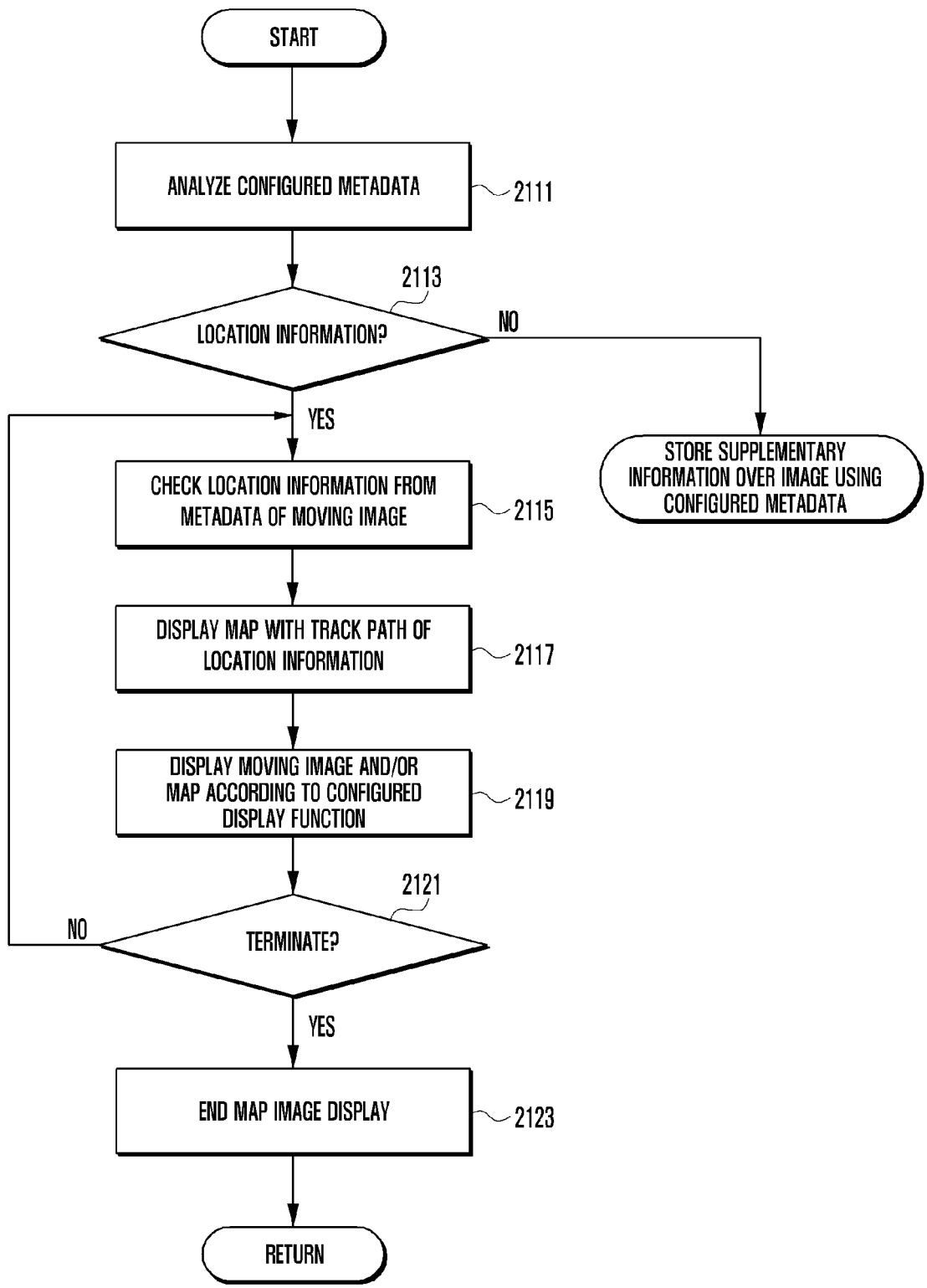
FIG. 21 is a flowchart illustrating the procedure of displaying location information of metadata over the moving image according to the exemplary embodiment of the present invention.

In step 1719, if no moving image metadata display request is detected, the method detects for a request for a moving image supplementary function in step 1723. The AP 140 is capable of presenting specific metadata, in the form of a video marker over the moving image being played currently. Accordingly, if the user requests a display to present specific metadata, the AP 140 detects user request at step 1723 and generates the supplementary information with configured metadata for performing a supplementary function with the selected metadata and presents the supplementary function along with the moving image according to the selected metadata at step 1725. FIG. 21 is a flowchart illustrating the procedure of displaying location information of metadata over the moving image according to the exemplary embodiment of the present invention, and FIGS. 22A to 22E are diagrams illustrating exemplary screen images displayed in the procedure of FIG. 21.

Referring to FIGS. 21 and 22A to 22E, the AP 140 analyzes the selected or configured metadata at step 2111. At this time, if the selected metadata is not the location information (e.g. GPS information), the AP detects that the selected information is not location information at step 2113, and the method stores supplementary information for display over an image using the selected or configured metadata. However, if the selected metadata is the location information (e.g. GPS information), the AP detects that the selected information is not location information at step 2113 and checks the location information in the metadata of the moving image being played (or selected) at step 2115. Afterward, the AP 140 accesses the map data corresponding to the location information and displays the map data with the tracking route in step 2117 by mapping the shooting location information of moving image. The AP 140 displays the moving image and/or the map in step 2119 according to the configured display function. If a location information display termination request is not input, the lack of such a request is detected by the AP 140 in step 2121, and the method loops back to repeatedly perform steps 2115-2121 until a termination request is detected. However, if a location information display termination request is input, the AP 140 detects the termination request at step 2121 and ends displaying the map at step 2123. The method then returns to step 1723 in FIG. 17

Figure 22A:
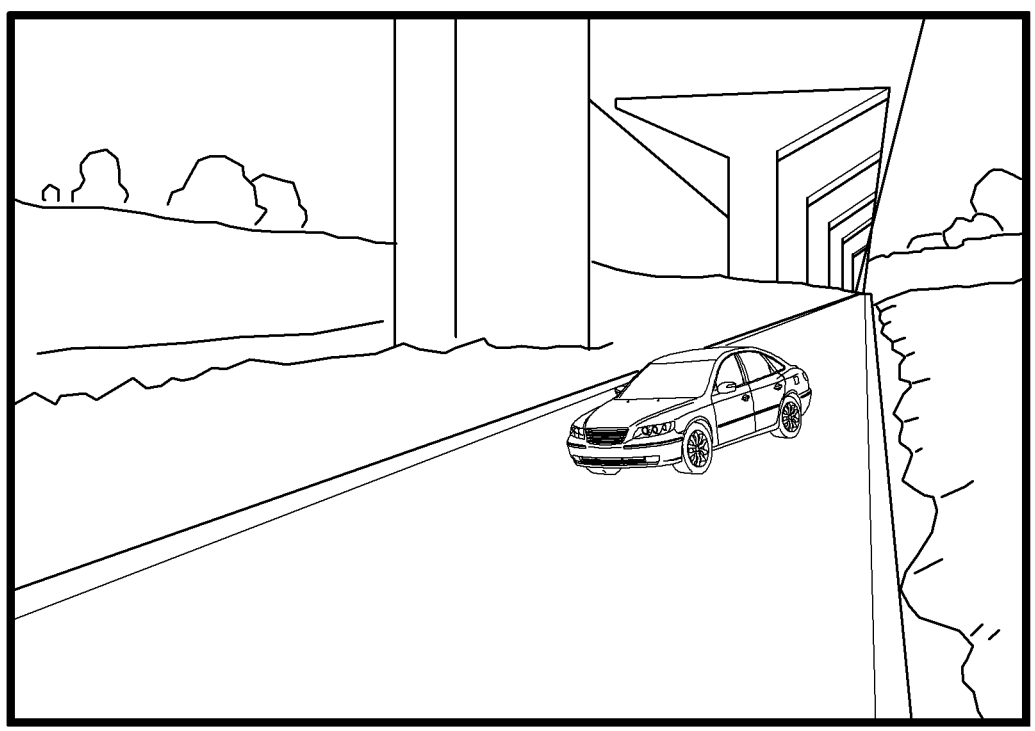
FIGS. 22A to 22E are diagrams illustrating exemplary screen images displayed in the procedure of FIG. 21.
Figure 22B:
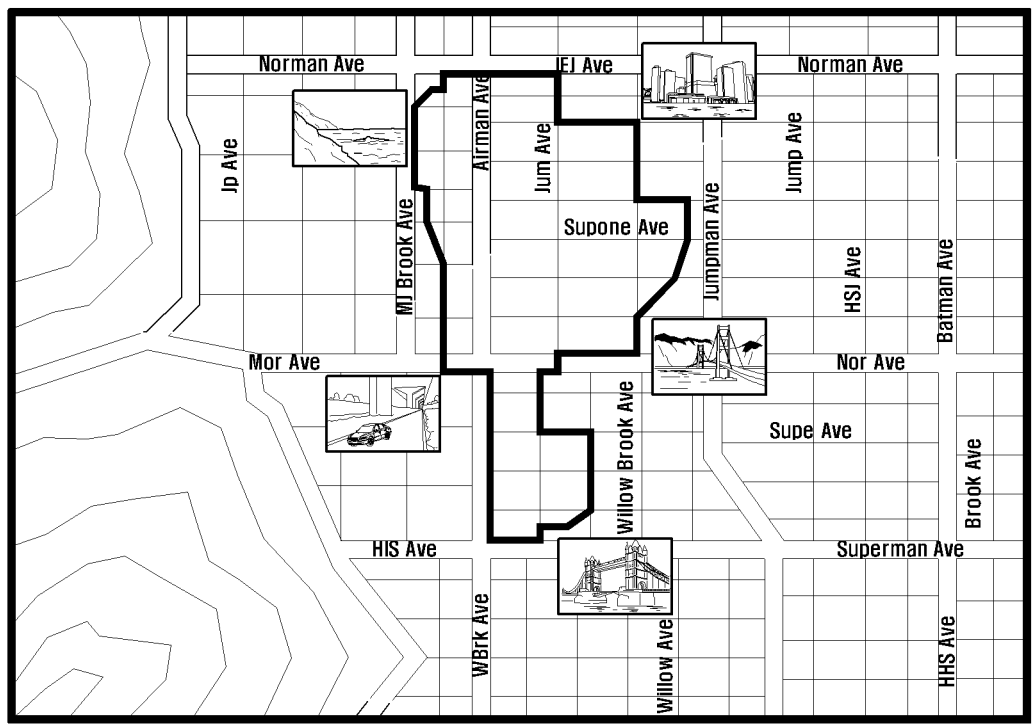
Figure 22C:
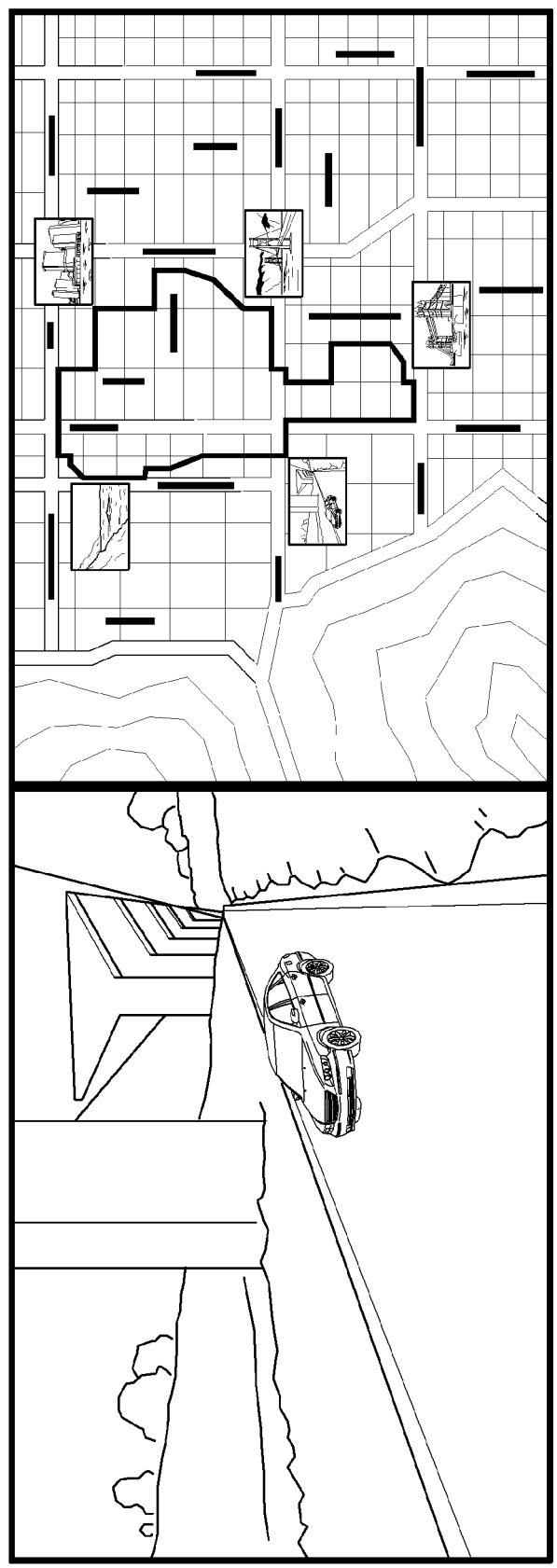
Figure 22D:
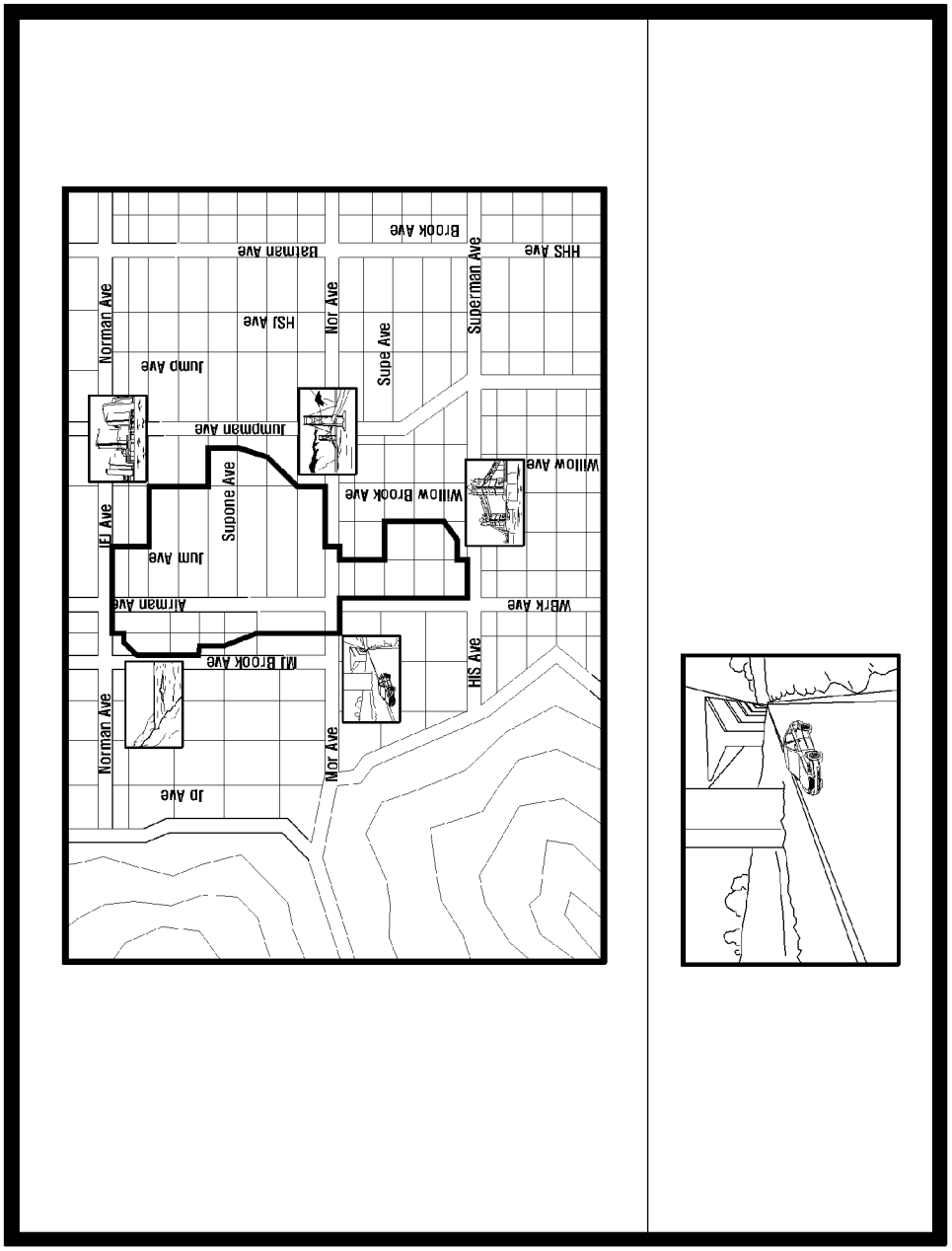
Figure 22E:
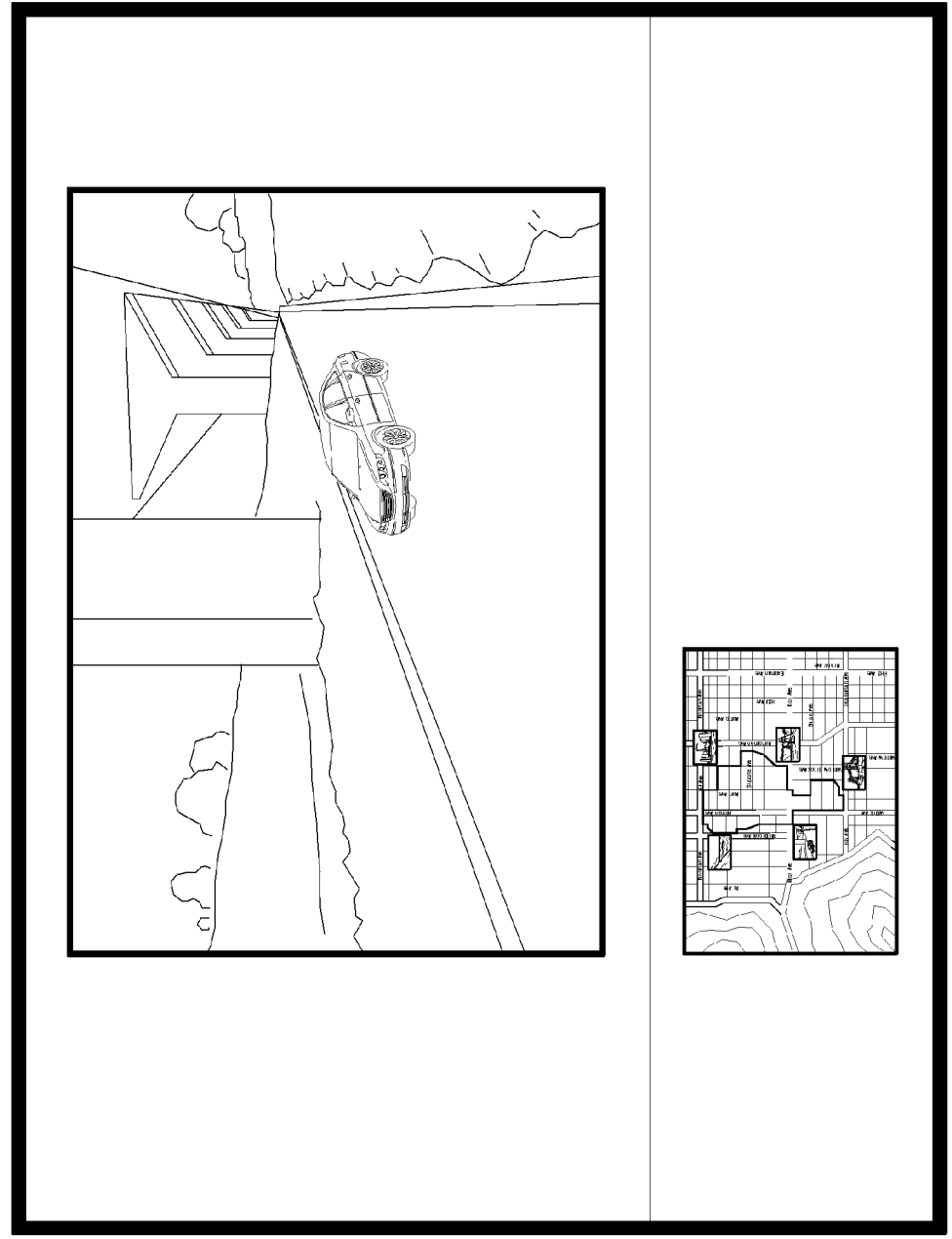

As described above, the AP 140 is capable of storing the viewing images in a compressed format along with the metadata associated with the corresponding metadata in the moving image shooting mode. The AP 140 is also capable of displaying a supplementary function with the shooting time and thumbnail images corresponding to the metadata on the screen using the shooting time. For example, if a location request command is input in the moving image playback or editing process, the AP 140 is capable of displaying the tracking route by linking the shooting locations of the moving image using the location information, time information, and thumbnail images included in the metadata. For example, it is possible to display the tracking route of the moving image in the middle of or before playing the moving image as shown in FIG. 22A. In this case, if the user selects the moving image and the metadata data, e.g. location information, to be presented, the AP 140 detects the user selection at step 2113 and displays the tracking route connecting the moving image shooting locations as shown in FIG. 22B through steps 2115 and 2117. At this time, the AP 140 is capable of displaying the thumbnail images included in the metadata at corresponding positions on the tracking route as shown in FIG. 22B and the thumbnail image display interval can be determined according to the user configuration. In the moving image playback mode, the AP 140 is capable of checking the time stamp and/or location information in the metadata of the frames of the moving image being played to mark the moving image shooting positions along the tracking route of the map as shown in FIG. 22B. When displaying the moving image or the map data at step 2119, the AP 140 is capable of displaying only the moving image as shown in FIG. 22A, only the map data as shown in FIG. 22B, both the moving image and map data as shown in FIG. 22C, the map data as the main screen and the moving image as a thumbnail image as shown in FIG. 22D, or the moving image as main screen and the map data as a thumbnail image as shown in FIG. 22E, according to the user's selection.

Figure 23:
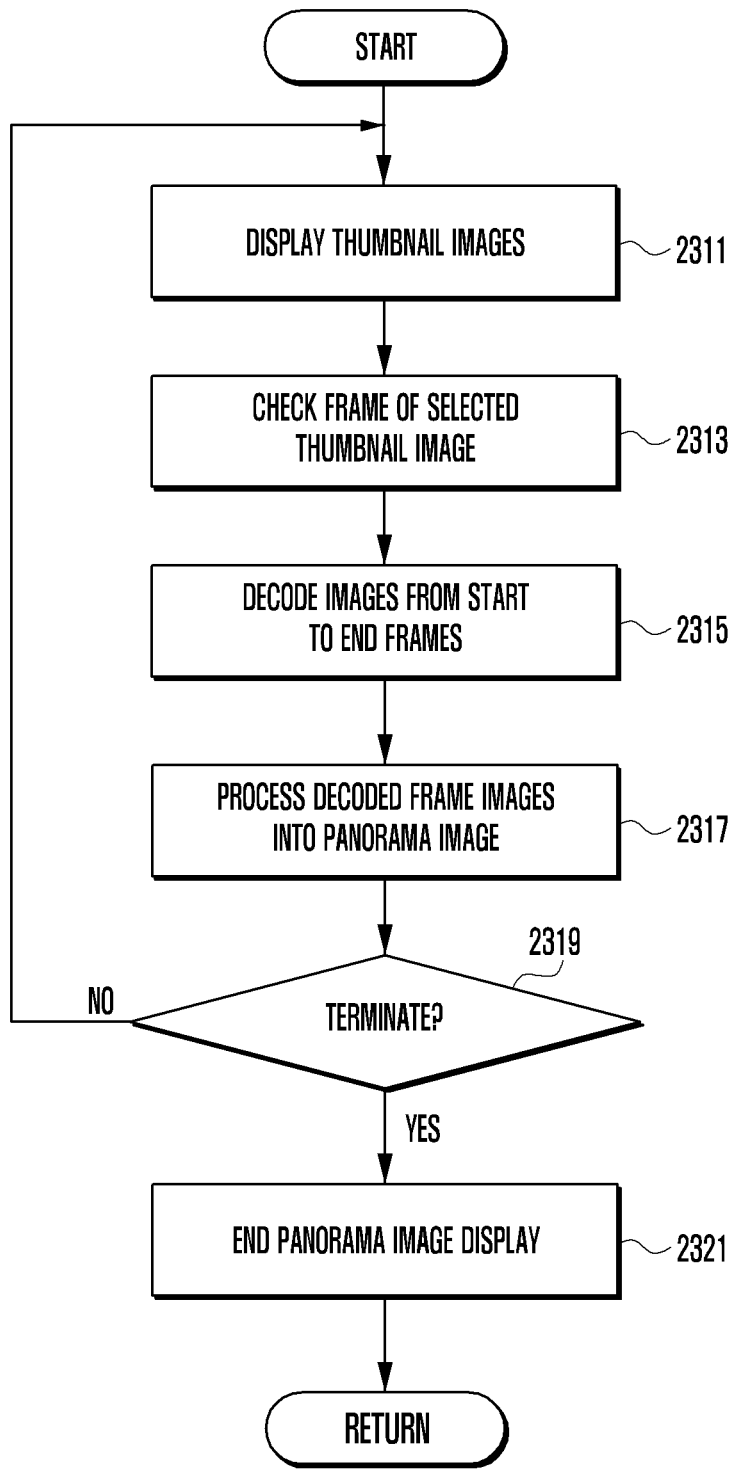
FIG. 23 is a flowchart illustrating the procedure of converting the moving image to a panorama image using the metadata according to the exemplary embodiment of the present invention.

The moving image also can be converted to a panorama image using the metadata of the moving image. Referring back to FIG. 17, if no moving image supplementary function is detected in step 1723, the method proceeds to step 1727. If a panorama image conversion function is selected in the moving image preview mode or moving image playback mode, the AP 140 detects the selected function at step 1727 of FIG. 17 and analyzes the selected metadata and processes the moving image to convert the moving picture shot at the selected location to generate a panorama image at step 1729. FIG. 23 is a flowchart illustrating the procedure of converting the moving image to a panorama image using the metadata according to the exemplary embodiment of the present invention, and FIG. 24 is a diagram illustrating exemplary images for demonstrating an example of conversion from a moving image and a corresponding panorama image through the procedure of FIG. 23.

Figure 24:
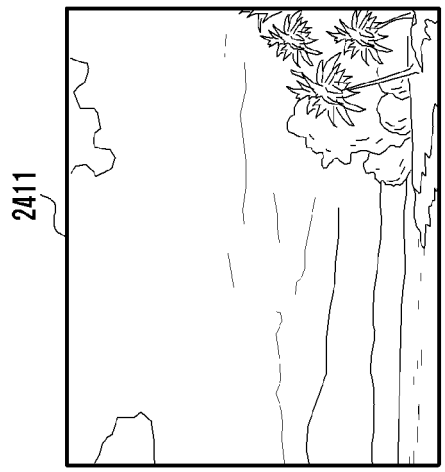
FIG. 24 is a diagram illustrating exemplary images for demonstrating an example of conversion from a moving image and a corresponding panorama image through the procedure of FIG. 23.
Figure 24:
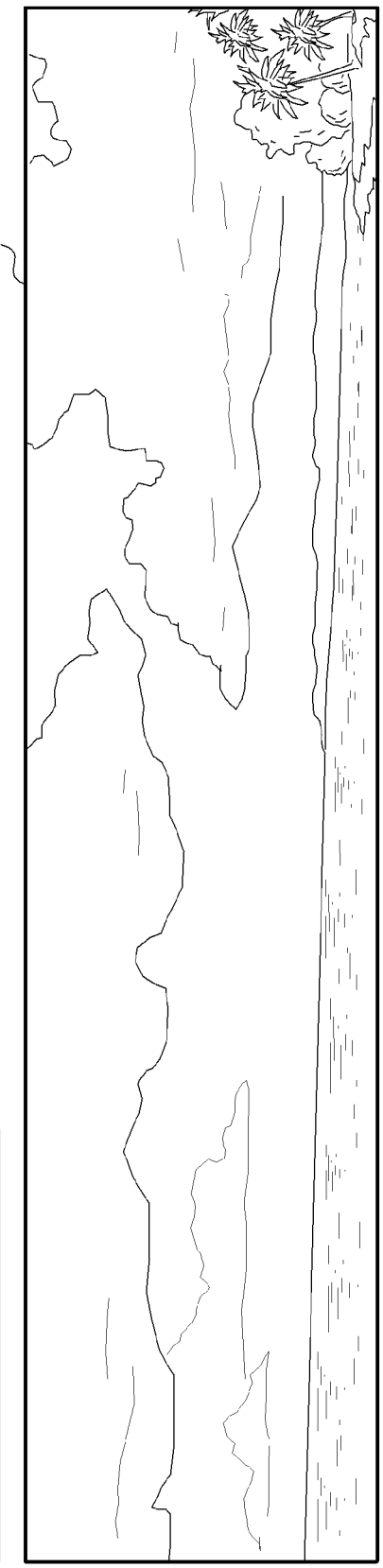

Referring to FIGS. 23 and 24, if a panorama conversion function and an interval of two thumbnail images are set in the thumbnail image display mode, and the thumbnail images are displayed at step 2311, the AP 140 checks the start and end frames of the selected thumbnail images at step 2313, decodes the images from the start frames to the end frames into still images at step 2315, and processes and combines the decoded images to generate a panorama image at step 2317. If the panorama image conversion image function is not termination as detected in step 2319, the method loops back to repeat steps 2311-2319 until a termination command is input and detected. However, if the panorama image conversion function is terminated, the AP 140 detects the termination command at step 2319 and ends the panorama image conversion operation and the panorama image display at step 2321, and the method then returns to step 1727 in FIG. 17. FIG. 23 shows the procedure of converting a moving image to a panorama image using the thumbnail images. The panorama image can be acquired by executing a panorama shot function using specific shooting information of the metadata. One method is to use a gyro sensor and/or an acceleration sensor. That is, if the camera device operating in the moving picture shooting mode is moved in a specific direction (e.g. stopping the camera at a specific position and then moving the camera device in a specific direction), the gyro sensor and/or the acceleration sensor detects the movement in that direction such that the AP 140 regards such detected movement as a panorama image shooting. In this case, referring to FIG. 24, the AP 140 analyzes the information generated by the gyro sensor among the metadata in the moving picture playback mode, and if a panorama movement pattern is detected based on the information from the gyro sensor, converts the moving picture 2411 to a panorama image 2413 shown in FIG. 24.

Figure 25:
FIG. 25 is a diagram illustrating exemplary images for demonstrating an example of the fine image quality adjustment procedure according to the exemplary embodiment of the present invention.
Figure 25:
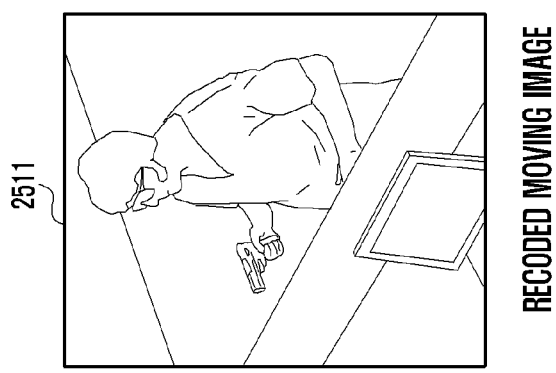

Referring back to FIG. 17, if no panoramic conversion selection is detected in step 1727, the method proceeds to step 1731 to detect if an image synthesis function is selected. If not, the method executes a corresponding or different function of the portable terminal. Otherwise, in step 1733, the method performs synthesis of images. The AP 140 is capable of combining or synthesizing the images of which metadata fulfill certain conditions to perform fine image quality adjustment using the metadata. Accordingly, if the image synthesis function for fine image quality adjustment is selected, the AP 140 detects the selection at step 1731 of FIG. 17 and combines the images of the corresponding frames using the configured metadata to perform the fine image quality adjustment function. FIG. 25 is a diagram illustrating exemplary images for demonstrating an example of the fine image quality adjustment procedure by combining images fulfilling certain conditions using the metadata of the moving image according to the exemplary embodiment of the present invention. As shown in FIG. 25, a CCTV, a security camera, or a car blackbox has no high quality camera and lacks processors for acquiring high quality images, and so low quality images 2511 are obtained. However, if metadata is generated and stored as described above while shooting a moving image, it is possible to adjust the video quality of the moving image using the metadata afterward. For example, if a moving image 2511 of FIG. 25 is recorded with a low video quality, a high quality picture 2513 can be stored as a backup using the metadata (e.g. impact reduction, motion sensitivity, etc.) stored in the moving picture shooting mode.

As described above, it is possible to store a moving image along with the metadata acquired in the shooting mode and executing the moving image playback in various ways using the stored metadata in the moving image playback mode.

Referring back to FIG. 17, after steps 1713, 1717, 1721, 1725, 1729, and 1733 are completed, the method loops back to step 1711 to continue processing moving images as described herein.

Figure 26:
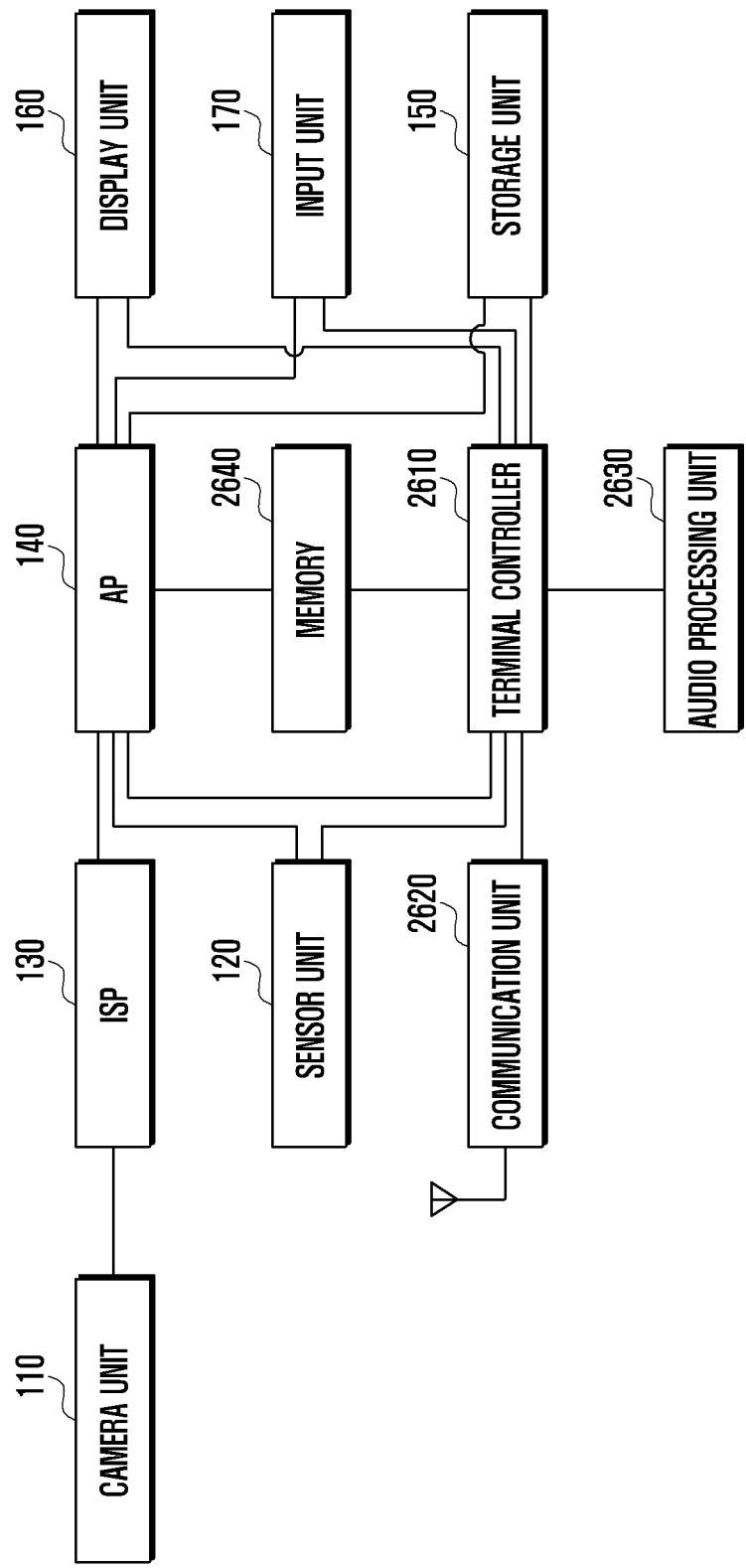
FIG. 26 is a block diagram illustrating the configuration of a terminal apparatus equipped with the camera device according to the exemplary embodiment of the present invention.

FIG. 26 is a block diagram illustrating the configuration of a terminal apparatus equipped with the camera device according to the exemplary embodiment of the present invention.

Referring to FIG. 26, the camera unit 110 is provided with a sensor unit 120 for acquiring an image in the camera operation mode. The sensor unit 120 may include at least one of a GPS receiver, a gyro sensor, an acceleration sensor, an altitude sensor, an impact sensor, a direction sensor, and an illuminance sensor. The sensor unit 120 is capable of being connected to the ISP 130 as shown in FIGS. 1 and 3 or the AP 140 as shown in FIGS. 5 and 6, or some of the sensors to the ISP 130 while the others to the AP 140. In the following, the description is made using an example such that the sensor unit 102 is connected to the AP 140.

The ISP 130 processes the image acquired using the camera unit 110 to generate the viewing image to be displayed on the display unit 160 and the compressed image and metadata per frame. Here, the viewing image can be a YUV image, and the compressed image can be a JPEG image. The metadata may include the exif information acquired when the camera unit 110 shoots an image and other information including the output of the sensor unit 120 of the terminal apparatus. The ISP 130 is capable of generating the viewing and compressed images and metadata at the frame rate of 30 fps or higher (60 fps).

The AP 140 is responsible for processing various application functions of the terminal apparatus. The AP 140 receives the output of the sensor unit 120 and processes various sensor applications in response to the user request. For example, the AP 140 is capable of processing a navigation function with the output of the GPS receiver, a local information search application based on the terminal location, and the application executing the function configured in the currently running application according to the motion of the terminal apparatus. In particular, in the exemplary embodiment of the present invention, the AP 140 controls the ISP 130 to buffer the viewing and compressed images and metadata generated at every frame and display the viewing image on the display unit 160 in the camera operation mode. If a user's capture command is generated, the AP 140 stores the compressed image at the capture request time among the images being buffered into the storage unit 150 so as to achieve zero shutter lag. In the state of buffering the metadata, the AP 140 generates the second shooting information with the sensor information output by the sensor unit 120, combines the shooting information and the first shooting information generated by the ISP 130 into the metadata, and buffers the metadata.

The AP 140 also compresses the viewing images into a moving image and stores the moving image in the storage unit 150 in the moving image shooting mode and regenerates the metadata according to the shooting condition, the regenerated metadata being stored in the storage unit 150. As described above, the shooting condition may include whether to use whole metadata or the delta value and whether to include the thumbnail images in the metadata and if so whether to compress the thumbnail images. The AP 140 generates and stores the moving image and metadata based on the aforementioned moving image shooting conditions and performs various supplementary functions using the metadata in the moving image playback mode.

The communication unit 2620 is responsible for communication with an external device or a base station. The communication unit 2620 may include a transmitter having a frequency up converter for up-converting the frequency of a signal to be transmitted to Radio Frequency (RF) band and an amplifier for amplifying the power of the transmit signal and a receiver having a low noise amplifier for low noise amplifying a received signal and a down converter for down converting the received RF signal to a base band signal. The communication unit 2620 may also include a modulator for modulating the transmit signal and transferring the modulated signal to the transmitter and a demodulator for demodulating the signal output by the receiver. Here, the modulator/demodulator can be any of a WCDMA, a GSM, a LTE, a Wi-Fi, and a Wibro modulator/demodulator.

The terminal controller 2610 controls overall operations of the terminal apparatus and voice and data communication functions. Here, the terminal controller 2610 can include the modulator/demodulator of the communication unit 2620, and in this case, the communication unit 2620 includes only the RF communication part. In this case, the terminal controller 2610 is capable of performing the signal modulation/demodulation and coding/decoding. The audio processing unit 2630 is connected to a voice transmitter/receiver of the terminal apparatus for processing voice in voice call session under the control of the terminal controller 2610. The memory 2640 can be a work memory for loading programs of the terminal controller 2610 and the AP 140, and in this case, the memory 2640 can be implemented with a RAM.

The input unit 170 generates various operation commands and data input signals to the terminal controller 1610 and the AP 140. In particular, in the exemplary embodiment of the present invention, the input unit 170 is capable of generating the camera driving command, capture command, moving image shooting command, and moving image playback command. The display unit 160 displays the operation and application execution state of the terminal apparatus under the control of the terminal controller 1610 and the AP 140. According to the exemplary embodiment of the present invention, the display unit 160 displays the viewing image output by the AP 140 in the preview mode and moving image shooting mode and decoded moving image and various supplementary images with the metadata in the moving image playback mode. Here, the input unit 170 can be a touch panel capable of sensing a touch input made by the user, and the display unit 160 can be an LCD or OLED panel for displaying the data and image generated by a program. The input unit 170 and the display unit 160 can be integrated into a touchscreen. The input unit 170 may include buttons arranged on or extending from an exterior of the camera device.

The storage unit 150 can be composed of a program memory for storing the Operating System (OS) and programs operating according to the exemplary embodiment of the present invention and a data memory for storing the data for operating and generated by the programs. In this case, the storage unit 150 can be implemented with a non-volatile memory such as flash memory. In particular, in the exemplary embodiment of the present invention, the storage unit 150 stores the metadata related to the moving image encoded in the moving image shooting mode. When the terminal apparatus powers on, the terminal controller 2610 loads the voice and data communication other terminal operation-related programs onto the memory 2640. If application execution is requested, the AP 140 loads the corresponding application program from the storage unit 150 onto the memory 2640. The memory 2640 operates as the work memory for loading the operation and application programs. Here, the AP 140 and the terminal controller 2610 may share the memory 2640 or use separately assigned memories.

According to the exemplary embodiment of the present invention, the AP 140 processes the image processing application of the camera unit 110 and various applications of the terminal apparatus. In order to process the various applications, the AP 140 is capable of receiving the output of the sensor unit 120, executing the applications using the output of the sensor unit 120, and controlling the application processing operation according to the output of the sensor unit 120. The terminal controller 2610 is also capable of receiving the output of the sensor unit 120, performing voice call and communication services, and controlling the voice call and communication services according to the output of the sensor unit 120.

In the outbound voice call procedure, the user is capable of entering the recipient's call number and a call placement signal using the input unit 170, and the terminal controller 2610 controls, upon detecting the call placement signal, the communication unit 2620 to establish a communication channel and manages the outbound call session via the base station. If an inbound call is received, the terminal controller 2610 detects the receipt of the inbound call using the communication unit 2620, generates an inbound call alarm using the audio processing unit 2630, and displays the inbound call information on the display unit 160. If the user accepts the inbound call using the input unit 170, the terminal controller 2610 establishes a communication path using the communication unit 2620 for the voice call service. In the case of a data communication service, the communication channel is established in the similar manner to the voice call service.

The terminal apparatus is capable of executing various applications. If the user requests executing a specific application through the input unit 170, the AP 140 executes the corresponding application and displays the execution result on the display unit 160. If the user request is the camera driving command, the AP 140 controls the ISP 130 to drive the camera unit 110. The ISP 130 processes the image taken by the camera unit 110 to generate the viewing and compressed images at every frame and the metadata per frame using the output of the camera unit 110 and the sensor unit 120. The AP 140 buffers the viewing and compressed images and metadata generated at every frame and displays the viewing image on the display unit as preview image. In this state, if the user enters the moving image shooting command through the input unit 170, the AP 140 encodes and compresses the viewing images being buffered into a moving image which is stored in the storage unit 150 and regenerates the metadata according to preconfigured conditions, with the regenerated metadata being stored in the storage unit. In the moving image playback mode, the AP decodes the stored moving image to play the moving image on the display unit along with various supplementary functions using the metadata (preview, shooting information presentation, metadata-based video marker function, tracking path of moving picture shooting locations, panorama image conversion, CCTV function, etc.).

As described above, the camera device or terminal apparatus equipped with a camera according to the present invention is capable of logging shooting information (metadata) and/or thumbnail images in the moving image shooting mode, playing and editing the moving image using the logged shooting information and thumbnail images, and utilizing the shooting information for updating indication information and executing supplementary functions. Also, the camera device or terminal apparatus equipped with a camera according to the present invention is capable of analyzing the shooting information (metadata) acquired at every frame to adjust the video quality automatically in recording and playing the moving image. That is, the present invention is capable of performing fine video quality adjustment using the shooting information (EV, metering, face detection, etc.) in addition to the frame data analysis-based video quality adjustment in recording mode and improving the playback video quality using the logged shooting information. Some information extracted from the logged shooting information can be provided in the form of a caption in the moving image playback mode and editing mode.

The above-described apparatus and methods according to the present invention can be implemented in hardware or firmware, or as software or computer code, or combinations thereof. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A moving image processing method of an apparatus equipped with a camera, the method comprising:
   acquiring images at every frame period in a moving image shooting mode;
   generating metadata of the images;
   encoding the images into a moving image;
   storing the generated metadata for each image by detecting a difference between a first metadata of a first image and a second metadata of a second image, and if the second metadata is different than the first metadata, regenerating the second metadata to store the detected difference; and
   displaying a specific metadata selected among the metadata as a supplementary function of the moving image in a moving image playback mode.

2. The method of claim 1, wherein the metadata comprises a thumbnail image of a corresponding frame viewing image.

3. The method of claim 2, wherein the supplementary function comprises displaying thumbnail images of frames adjacent to a current frame being displayed which is acquired by parsing a timestamp in a moving image preview mode.

4. The method of claim 2, wherein the supplementary function comprises outputting the metadata of the moving image.

5. The method of claim 2, wherein the supplementary function comprises outputting the metadata of the moving image as a caption.

6. The method of claim 2, wherein the supplementary function comprises outputting a selected metadata along with the moving image, wherein the selected metadata are shooting location information forming a tracking path output on a map.

7. The method of claim 2, wherein the supplementary function comprises converting the moving image to a panorama image by analyzing the selected metadata of the moving image.

8. The method of claim 2, wherein the supplementary function comprises processing the moving image to generate a high video quality picture using the metadata of the moving image.

9. The method of claim 1, wherein:
the first image is designated as a reference image separated temporally from another reference image by the frame period, and the second image is disposed temporally between the reference image and a temporally subsequent reference image.

10. The method of claim 1, further comprising:
designating a plurality of reference frames throughout the moving image according to the frame period, wherein:
metadata for images non-designated as one of the plurality of reference frames include only a difference between each of the non-designated images and a preceding frame.

11. A moving image shooting and playback apparatus, the apparatus comprising:
a camera which acquires a plurality of consecutive frame images;
an image signal processor which processes the consecutive frame images acquired by the camera and generates camera shooting information of the consecutive frame images;
a sensor unit which comprises at least one sensor;
an application processor configured to:
encode the consecutive frame images into the moving image;
store metadata items being output by the camera and the sensor unit in a moving image shooting mode by comparing a first metadata of a first image and a second metadata of a second image to detect a difference, and if the second metadata is different than the first metadata, regenerating the second metadata to include the detected difference; and
display the moving image along with a specific metadata selected among the metadata as a supplementary function in a moving image playback mode;
a storage unit which stores the moving image; and
a display unit which displays the moving image under a control of the application processor.

12. The apparatus of claim 11, wherein the application processor includes, in the metadata, a thumbnail image of a corresponding frame viewing image.

13. The apparatus of claim 12, wherein the application processor displays a plurality of thumbnail images of frames adjacent to a current frame being displayed which is acquired by parsing a timestamp in a moving image preview mode.

14. The apparatus of claim 12, wherein the application processor outputs the metadata of the moving image.

15. The apparatus of claim 12, wherein the application processor outputs the metadata of the moving image as a caption.

16. The apparatus of claim 12, wherein the application processor outputs a selected metadata along with the moving image, and the selected metadata are shooting location information forming a tracking path output on a map.

17. The apparatus of claim 12, wherein the application processor analyzes a selected metadata of the moving image and converts the moving image to a panorama image based on the analysis result.

18. The apparatus of claim 12, wherein the application processor processes the moving image to generate a high video quality picture using the metadata of the moving image.

19. A terminal apparatus comprising:
a communication unit which performs a radio communication with an external device;
a terminal controller which controls voice call and communication services of the terminal through communication unit;
a camera which acquires images in a moving image shooting mode;
an image signal processor which converts the images acquired at every frame into viewing images and generates metadata of the viewing images;
an application processor which encodes the viewing images into the moving image, and stores the generated metadata for each of the viewing images by detecting a difference between a first metadata of a first image and a second metadata of a second image, and if the second metadata is different than the first metadata, regenerating the second metadata to store the detected difference; and
a display unit which displays the moving image.

20. The terminal apparatus of claim 19, further comprising a sensor unit, wherein the application processor generates the metadata by combining an output of the image signal processor and output of the sensor unit.

21. The terminal apparatus of claim 20, wherein the application processor outputs a specific metadata selected among the metadata as a supplementary function in a moving image playback mode.

22. The terminal apparatus of claim 19, wherein the application processor includes, in the metadata, thumbnail images corresponding to the viewing images.

23. The terminal apparatus of claim 22, wherein the thumbnail images included in the metadata are selected at a predetermined number of frames.

* * * * *